US012645961B2

(12) United States Patent
Balakrishnan et al.

(10) Patent No.:  US 12,645,961 B2
(45) Date of Patent:  Jun. 2, 2026

(54) CONSTRAINED DECISION-MAKING AND EXPLANATION OF A RECOMMENDATION

(71) Applicant: International Business Machines Corporation, Armonk, NY (US)

(72) Inventors: Avinash Balakrishnan, Elmsford, NY (US); Djallel Bouneffouf, Wappinger Falls, NY (US); Nicholas Mattei, White Plains, NY (US); Francesca Rossi, Chappaqua, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 809 days.

(21) Appl. No.: 16/050,176

(22) Filed: Jul. 31, 2018

(65) Prior Publication Data

US 2020/0019871 A1      Jan. 16, 2020

Related U.S. Application Data

(60) Provisional application No. 62/697,242, filed on Jul. 12, 2018.

(51) Int. Cl.
| | |
|---|---|
| *G06N 5/045* | (2023.01) |
| *G06N 5/01* | (2023.01) |
| *G06N 20/00* | (2019.01) |

(52) U.S. Cl.
CPC .............. *G06N 5/045* (2013.01); *G06N 5/01* (2023.01); *G06N 20/00* (2019.01)

(58) Field of Classification Search
None
See application file for complete search history.

(56) References Cited

U.S. PATENT DOCUMENTS

| | | | |
|---|---|---|---|
| 7,257,566 B2 | 8/2007 | Danielson et al. | |
| 2014/0101079 A1 | 4/2014 | Deal | |

(Continued)

FOREIGN PATENT DOCUMENTS

| | | | | |
|---|---|---|---|---|
| EP | 2816511 A1 | * | 12/2014 | ............. G06Q 50/01 |
| IN | 201711018234 A | | 6/2017 | |
| WO | WO-2012071543 A2 | * | 5/2012 | ............. G06Q 30/06 |

OTHER PUBLICATIONS

Xia, Yingce, et al. "Thompson sampling for budgeted multi-armed bandits." arXiv preprint arXiv:1505.00146 (2015). (Year: 2015).*

(Continued)

*Primary Examiner* — Omar F Fernandez Rivas
*Assistant Examiner* — Chaitanya R Jayakumar
(74) *Attorney, Agent, or Firm* — Amin, Turocy & Watson, LLP

(57) ABSTRACT

Systems, computer-implemented methods, and computer program products to facilitate constrained decision-making and explanation of a recommendation are provided. According to an embodiment, a system can comprise a memory that stores computer executable components and a processor that executes the computer executable components stored in the memory. The computer executable components can comprise a recommendation component that can recommend a decision based on one or more decision policies. The decision can comply with one or more constraints of a constrained decision policy. The computer executable components can further comprise an explanation component that can generate an explanation of the decision. The explanation can comprise one or more factors contributing to the decision.

20 Claims, 10 Drawing Sheets

(56)                References Cited

U.S. PATENT DOCUMENTS

| | | | |
|---|---|---|---|
| 2016/0223218 A1 | 8/2016 | Barrett | |
| 2017/0098236 A1* | 4/2017 | Lee | G06Q 30/0244 |
| 2017/0103413 A1* | 4/2017 | He | G06Q 30/0244 |

OTHER PUBLICATIONS

Wu, Huasen, et al. "Algorithms with logarithmic or sublinear regret for constrained contextual bandits." arXiv preprint arXiv:1504. 06937 (2015). (Year: 2015).*

Henderson, James, Oliver Lemon, and Kallirroi Georgila. "Hybrid reinforcement/supervised learning of dialogue policies from fixed data sets." Computational Linguistics 34.4 (2008): 487-511. (Year: 2008).*

Slivkins, Aleksandrs. "Contextual bandits with similarity information." Proceedings of the 24th annual Conference On Learning Theory. JMLR Workshop and Conference Proceedings, 2011. (Year: 2011).*

Fernandez, Fernando, and Manuela Veloso. "Probabilistic policy reuse in a reinforcement learning agent." Proceedings of the fifth international joint conference on Autonomous agents and multiagent systems. 2006. (Year: 2006).*

Tekin, Cem, Simpson Zhang, and Mihaela van der Schaar. "Distributed online learning in social recommender systems." IEEE Journal of Selected Topics in Signal Processing 8.4 (2014): 638-652. (Year: 2014).*

Lebanon, Guy, et al. "Beyond k-anonymity: A decision theoretic framework for assessing privacy risk." Transactions on Data Privacy (2009). (Year: 2009).*

Durfee, Edmund H., and Satinder Singh. "Commitment semantics for sequential decision making under reward uncertainty." 2015 AAAI Fall Symposium Series. 2015. (Year: 2015).*

Moriarty, David E., Alan C. Schultz, and John J. Grefenstette. "Evolutionary algorithms for reinforcement learning." Journal of Artificial Intelligence Research 11 (1999): 241-276. (Year: 1999).*

Bone, Nicholas. "A survey of transfer learning methods for reinforcement learning." (2008). (Year: 2008).*

Braun, Gábor, and Sebastian Pokutta. "Common information and unique disjointness." Algorithmica 76 (2016): 597-629. (Year: 2016).*

Xu, Tianbing, et al. "Thompson sampling in dynamic systems for contextual bandit problems." arXiv preprint arXiv:1310.5008 (2013). (Year: 2013).*

Taylor, Matthew E., et al. "Reinforcement learning agents providing advice in complex video games." Connection Science 26.1 (2014): 45-63. (Year: 2014).*

Zimmer, Matthieu, Paolo Viappiani, and Paul Weng. "Teacher-student framework: a reinforcement learning approach." AAMAS Workshop autonomous robots and multirobot systems. 2014. (Year: 2014).*

Torrey, Lisa, and Matthew Taylor. "Teaching on a budget: Agents advising agents in reinforcement learning." Proceedings of the 2013 international conference on Autonomous agents and multi-agent systems. 2013. (Year: 2013).*

Lepora, Nathan F. "Threshold learning for optimal decision making." Advances in Neural Information Processing Systems 29 (2016) . (Year: 2016).*

Sofman, Boris, J. Andrew Bagnell, and Anthony Stentz. "Bandit-based online candidate selection for adjustable autonomy." Field and Service Robotics: Results of the 7th International Conference. Springer Berlin Heidelberg, 2010. (Year: 2010).*

Durkota, Karel, and Viliam Lisy. "Computing optimal policies for attack graphs with action failures and costs." Stairs 2014. IOS Press, 2014. 101-110. (Year: 2014).*

Bednowitz, Noah, Rajan Batta, and Rakesh Nagi. "Dispatching and loitering policies for unmanned aerial vehicles under dynamically arriving multiple priority targets." Journal of simulation 8.1 (2014): 9-24. (Year: 2014).*

Ruttenberg, Brian E., and Avi Pfeffer. "Decision-making with complex data structures using probabilistic programming." arXiv preprint arXiv:1407.3208 (2014). (Year: 2014).*

Boicu, et al., Lazy Rule Refinement by Knowledge-Based Agents, Proceedings of the 5th International Conference on Machine Learning and Applications, 2006, 7 pages.

Gonzalez, et al., Instance-based learning in dynamic decision making, Cognitive Science, Jan. 10, 2003, pp. 591-635.

Domingos, Unifying Instance-Based and Rule-Based Induction, Machine Learning, 1996, pp. 141-168, vol. 24.

Agrawal, et al., Thompson sampling for contextual bandits with linear payoffs, Proceedings of the 30th International conference on Machine Learning, 2013, 9 Pages.

Agrawal, et al., Linear Contextual Bandits with Knapsacks, Jul. 9, 2016, 16 pages.

Armstrong, et al., Motivated Value Selection for Artificial Agents, Artificial Intelligence and Ethics: Papers from the 2015 AAAI Workshop, 2015, 9 pages.

Auer, et al., Finite-time Analysis of the Multiarmed Bandit Problem, Machine Learning, 2002, pp. 235-256, vol. 47.

Briggs, et al., "Sorry, I can't do that": Developing Mechanisms to Appropriately Reject Directives in Human-Robot Interactions, 2015, 5 pages.

Chu, et al., Contextual Bandits with Linear Payoff Functions, Proceedings of the 14th International Conference on Artificial Intelligence and Statistics, 2011, 7 pages.

Harper, et al., The MovieLens Datasets: History and Context, ACM Transactions on Interactive Intelligent Systems, 2015, 20 pages.

Anonymous, Market segmentation, https://en.wikipedia.org/wiki/Market_segmentation, Last accessed Jul. 6, 2018.

Lai, et al., Asymptotically Efficient Adaptive Allocation Rules, Advances in Applied Mathematics, Jul. 6, 1983, pp. 4-22.

Langford, et al., The Epoch-Greedy Algorithm for Contextual Multi-armed Bandits, Last Accessed: Jun. 7, 2018, 8 pages.

Li, et al., A Contextual-Bandit Approach to Personalized News Article Recommendation, Mar. 2012, 10 pages.

Mary, et al., Bandits and Recommender Systems, First International Workshop on Machine Learning, Optimization, and Big Data, Jul. 2015, 13 pages.

Mnih, et al., Playing Atari with Deep Reinforcement Learning, Last Accessed: Jun. 7, 2018, 9 pages.

Sen, Choice, ordering and morality, Practical Reason, 1974, 3 Pages.

Sutton, et al., Reinforcement Learning: An Introduction, Nov. 5, 2017, Chapter 2, 36 pages, 2nd Edition.

Villar, et al., Multi-armed Bandit Models for the Optimal Design of Clinical Trials: Benefits and Challenges, Statistical Science, Jul. 29, 2015, 18 pages, vol. 30, No. 2.

Wu, et al., Algorithms with Logarithmic or Sublinear Regret for Constrained Contextual Bandits, Last Accessed: Jun. 7, 2018, 9 pages.

Abel, et al., Reinforcement Learning As a Framework for Ethical Decision Making, Last Accessed: Jun. 12, 2018, 8 pages.

Agrawal, et al., Analysis of Thompson Sampling for the Multi-armed Bandit Problem, JMLR: Workshop and Conference Proceedings, 25th Annual Conference on Learning Theory, 2012, pp. 39.1-39.26, vol. 23.

Auer, et al., On-line learning with malicious noise and the closure algorithm, Annals of Mathematics and Artificial Intelligence, 1998, pp. 83-99, vol. 23.

Auer, et al., The Nonstochastic Multiarmed Bandit Problem, Society for Industrial and Applied Mathematics, 2002, pp. 48-77, vol. 32, No. 1.

Bastani, et al., Online Decision-Making with High-Dimensional Covariates, Last Accessed: Jun. 12, 2018, 57 pages.

Bell, et al., Lessons from the Netflix prize challenge, SIGKDD Explorations, Last Accessed: Jun. 12, 2018, 5 pages, vol. 9, No. 2.

Bonnefon, et al., "The social dilemma of autonomous vehicles," http://science.sciencemag.org/ on Jun. 23, 2016, 5 pages.

Bouneffouf, et al., Context Attentive Bandits: Contextual Bandit with Restricted Context, Proceedings of the Twenty-Sixth International Joint Conference on Artificial Intelligence, Last Accessed: Jun. 12, 2018, pp. 1468-1475.

(56)          References Cited

OTHER PUBLICATIONS

Budnitz, et al., National surveillance of emergency department visits for outpatient adverse drug events, JAMA, Oct. 18, 2006, pp. 1858-1866, vol. 296, No. 15.

Kaufmann, et al., Thompson Sampling: An Asymptotically Optimal Finite Time Analysis, Jul. 20, 2012, 16 pages.

Kveton, et al., Matroid bandits: Fast combinatorial optimization with learning, Jun. 16, 2014, 12 Pages.

Schafer, et al., Collaborative filtering recommender systems, The Adaptive Web, 2007, pp. 291-324.

Shivaswamy, et al., Multi-armed bandit problems with history, In Proceedings of the 15th International Conference on Artificial Intelligence and Statistics, 2012, pp. 1046-1054.

Thompson, On the likelihood that one unknown probability exceeds another in view of the evidence of two samples, Last Accessed: Jun. 12, 2018, 10 pages.

Wysowski, et al., Bleeding Complications With Warfarin Use: A prevalent adverse effect resulting in regulatory action, Arch Intern Med., vol. 167 (No. 13), Jul. 9, 2007, 6 pages.

Joseph, et al., Fairness in learning: Classic and contextual bandits, Nov. 8, 2016, 28 Pages.

Liu, et al., Calibrated Fairness in Bandits, In Proceedings of FAT-ML, Sep. 2017, 7 pages.

Schumann, et al., The diverse cohort selection problem: Multi-armed bandits with varied pulls, Sep. 11, 2017, 13 Pages.

* cited by examiner

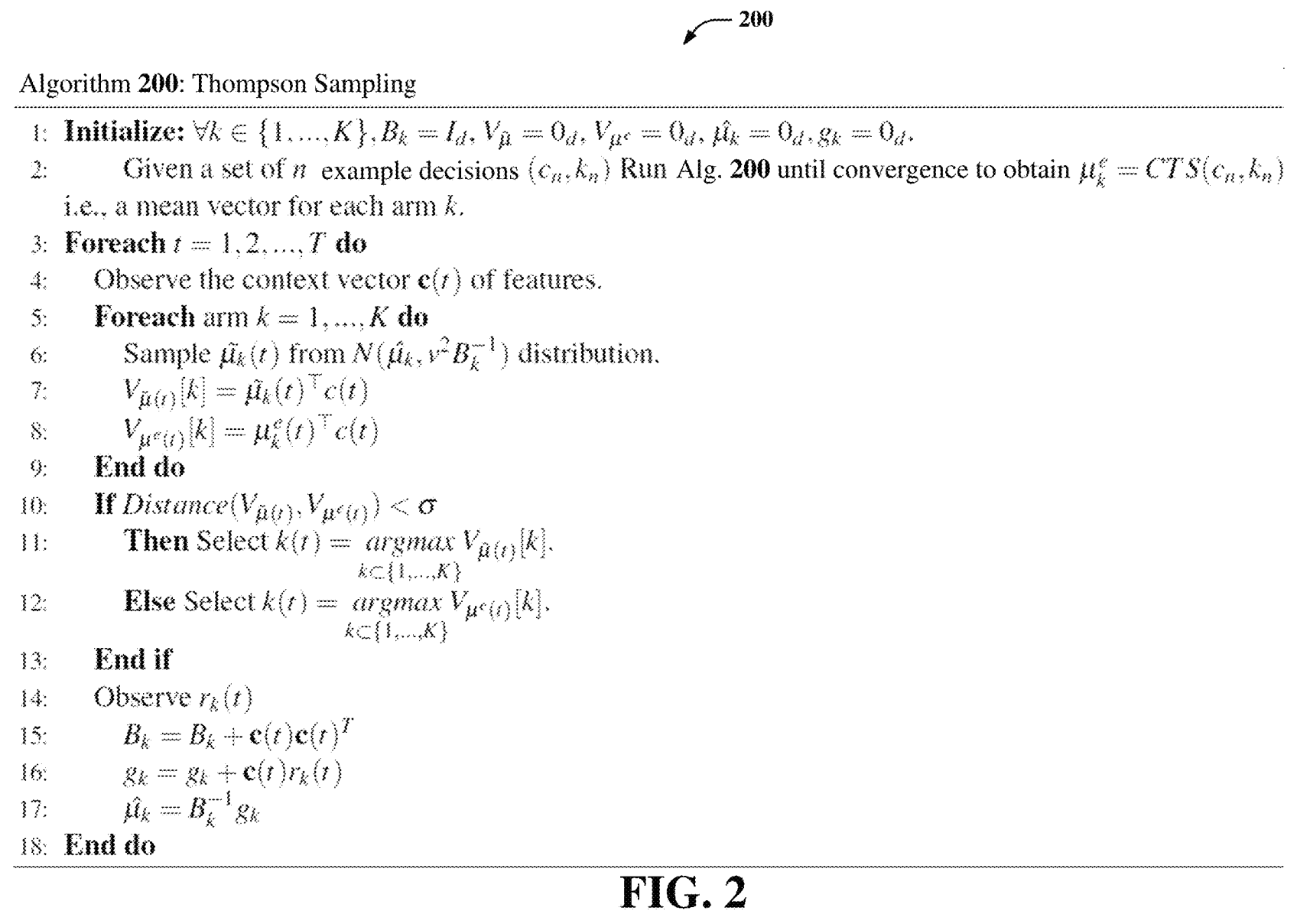

200

Algorithm 200: Thompson Sampling

1: Initialize: $\forall k \in \{1,\ldots,K\}, B_k = I_d, V_\mu = I_d, V_{\mu^c} = O_d, V_{\mu^c} = O_d, \hat{\mu}_k = O_d, g_k = O_d,$ 2:    Given a set of $n$ example decisions $(c_n, k_n)$ Run Alg. 200 until convergence to obtain $\mu_k^c = CTS(c_n, k_n)$ i.e., a mean vector for each arm $k$.

3: Foreach $t = 1, 2, \ldots, T$ do

4:    Observe the context vector $c(t)$ of features.

5:    Foreach arm $k = 1, \ldots, K$ do

6:      Sample $\hat{\mu}_k(t)$ from $N(\hat{\mu}_k, \nu^2 B_k^{-1})$ distribution.

7:      $V_{\hat{\mu}(t)}[k] = \hat{\mu}_k(t)^\top c(t)$

8:      $V_{\mu^c(t)}[k] = \mu_k^c(t)^\top c(t)$

9:    End do

10:    If $Distance(V_{\hat{\mu}(t)}, V_{\mu^c(t)}) < \sigma$

11:      Then Select $k(t) = \underset{k \in \{1,\ldots,K\}}{argmax} V_{\hat{\mu}(t)}[k]$.

12:      Else Select $k(t) = \underset{k \in \{1,\ldots,K\}}{argmax} V_{\mu^c(t)}[k]$.

13:    End if

14:    Observe $r_k(t)$

15:    $B_k = B_k + c(t)c(t)^T$

16:    $g_k = g_k + c(t)r_k(t)$

17:    $\hat{\mu}_k = B_k^{-1} g_k$

18: End do

FIG. 2

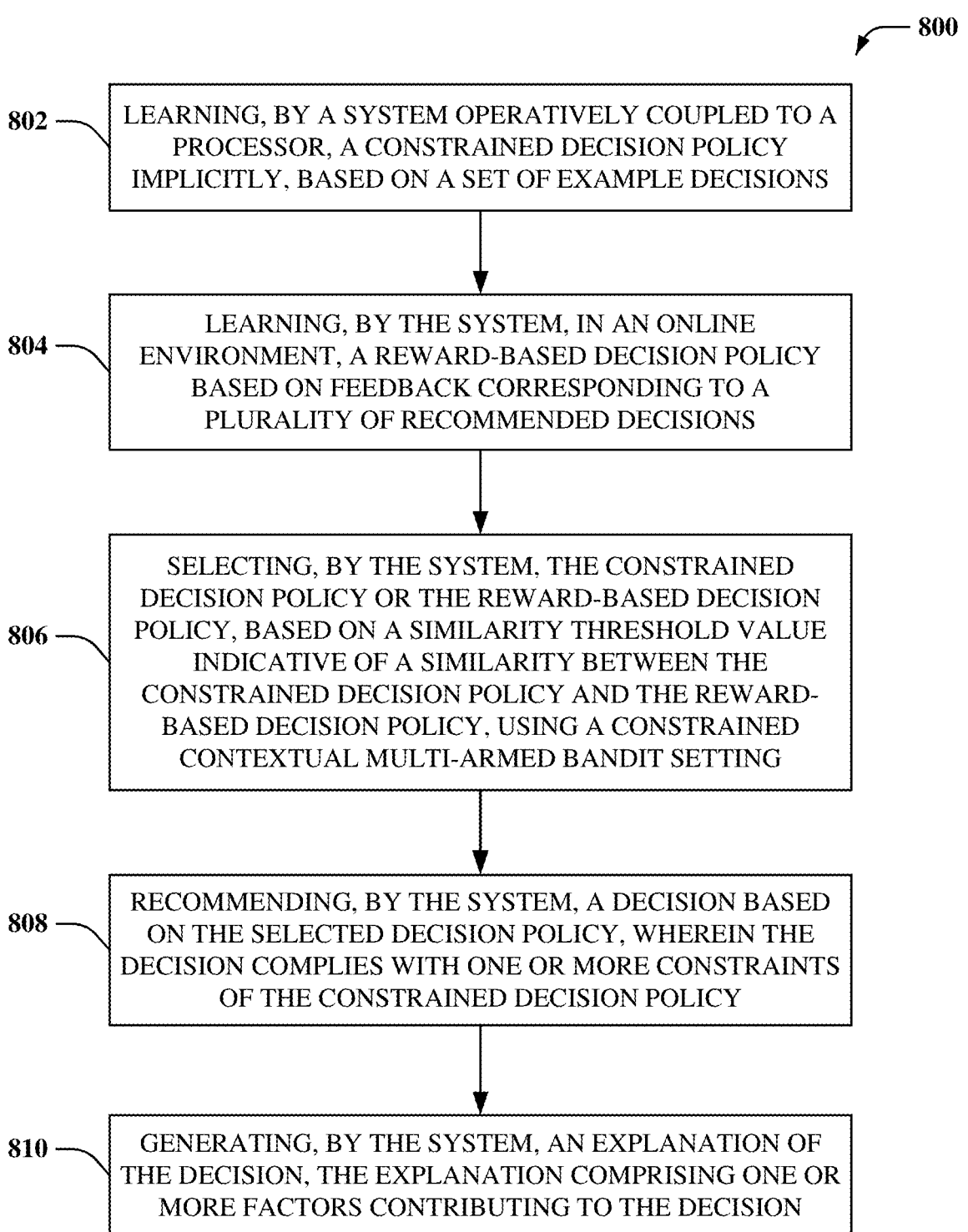

802 — LEARNING, BY A SYSTEM OPERATIVELY COUPLED TO A PROCESSOR, A CONSTRAINED DECISION POLICY IMPLICITLY, BASED ON A SET OF EXAMPLE DECISIONS

804 — LEARNING, BY THE SYSTEM, IN AN ONLINE ENVIRONMENT, A REWARD-BASED DECISION POLICY BASED ON FEEDBACK CORRESPONDING TO A PLURALITY OF RECOMMENDED DECISIONS

806 — SELECTING, BY THE SYSTEM, THE CONSTRAINED DECISION POLICY OR THE REWARD-BASED DECISION POLICY, BASED ON A SIMILARITY THRESHOLD VALUE INDICATIVE OF A SIMILARITY BETWEEN THE CONSTRAINED DECISION POLICY AND THE REWARD-BASED DECISION POLICY, USING A CONSTRAINED CONTEXTUAL MULTI-ARMED BANDIT SETTING

808 — RECOMMENDING, BY THE SYSTEM, A DECISION BASED ON THE SELECTED DECISION POLICY, WHEREIN THE DECISION COMPLIES WITH ONE OR MORE CONSTRAINTS OF THE CONSTRAINED DECISION POLICY

810 — GENERATING, BY THE SYSTEM, AN EXPLANATION OF THE DECISION, THE EXPLANATION COMPRISING ONE OR MORE FACTORS CONTRIBUTING TO THE DECISION

FIG. 8

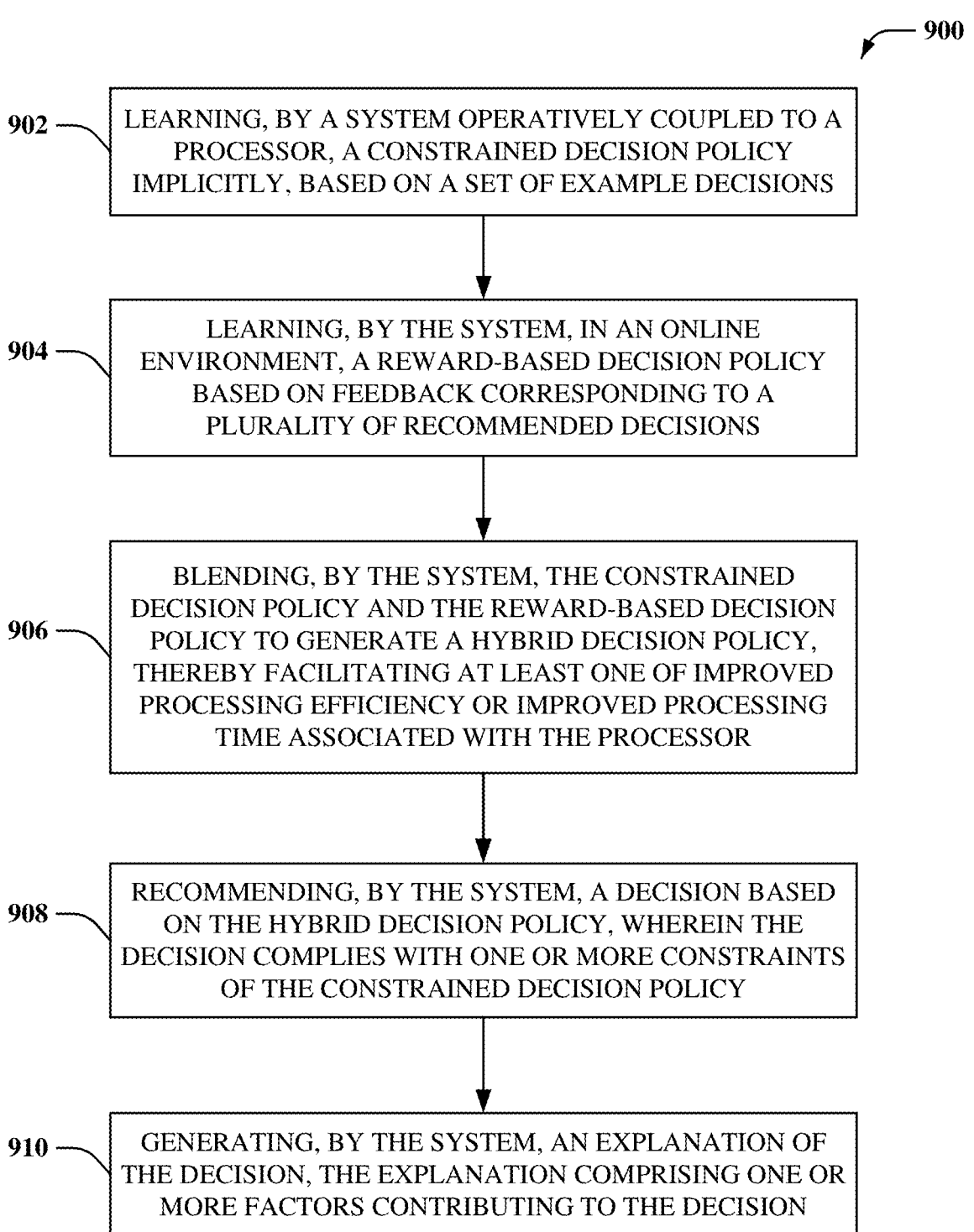

900

902 — LEARNING, BY A SYSTEM OPERATIVELY COUPLED TO A PROCESSOR, A CONSTRAINED DECISION POLICY IMPLICITLY, BASED ON A SET OF EXAMPLE DECISIONS

904 — LEARNING, BY THE SYSTEM, IN AN ONLINE ENVIRONMENT, A REWARD-BASED DECISION POLICY BASED ON FEEDBACK CORRESPONDING TO A PLURALITY OF RECOMMENDED DECISIONS

906 — BLENDING, BY THE SYSTEM, THE CONSTRAINED DECISION POLICY AND THE REWARD-BASED DECISION POLICY TO GENERATE A HYBRID DECISION POLICY, THEREBY FACILITATING AT LEAST ONE OF IMPROVED PROCESSING EFFICIENCY OR IMPROVED PROCESSING TIME ASSOCIATED WITH THE PROCESSOR

908 — RECOMMENDING, BY THE SYSTEM, A DECISION BASED ON THE HYBRID DECISION POLICY, WHEREIN THE DECISION COMPLIES WITH ONE OR MORE CONSTRAINTS OF THE CONSTRAINED DECISION POLICY

910 — GENERATING, BY THE SYSTEM, AN EXPLANATION OF THE DECISION, THE EXPLANATION COMPRISING ONE OR MORE FACTORS CONTRIBUTING TO THE DECISION

FIG. 9

CONSTRAINED DECISION-MAKING AND EXPLANATION OF A RECOMMENDATION

BACKGROUND

The subject disclosure relates to decision-making systems, and more specifically, to constrained decision-making and explanation of a recommendation.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, and/or computer program products that facilitate constrained decision-making and explanation of a recommendation are described.

According to an embodiment, a system can comprise a memory that stores computer executable components and a processor that executes the computer executable components stored in the memory. The computer executable components can comprise a recommendation component that can recommend a decision based on one or more decision policies. The decision can comply with one or more constraints of a constrained decision policy. The computer executable components can further comprise an explanation component that can generate an explanation of the decision. The explanation can comprise one or more factors contributing to the decision.

According to another embodiment, a computer-implemented method can comprise recommending, by a system operatively coupled to a processor, a decision based on one or more decision policies. The decision can comply with one or more constraints of a constrained decision policy. The computer-implemented method can further comprise generating, by the system, an explanation of the decision. The explanation can comprise one or more factors contributing to the decision.

According to yet another embodiment, a computer program product that can facilitate a constrained decision-making and explanation of a recommendation process is provided. The computer program product can comprise a computer readable storage medium having program instructions embodied therewith, the program instructions can be executable by a processing component to cause the processing component to recommend, by the processor, a decision based on one or more decision policies. The decision can comply with one or more constraints of a constrained decision policy. The program instructions can further cause the processing component to generate, by the processor, an explanation of the decision. The explanation can comprise one or more factors contributing to the decision.

DESCRIPTION OF THE DRAWINGS

FIG. 2 illustrates an example, non-limiting algorithm that facilitates constrained decision-making and explanation of a recommendation components in accordance with one or more embodiments described herein.

FIG. 8 illustrates a flow diagram of an example, non-limiting computer-implemented method that facilitates constrained decision-making and explanation of a recommendation components in accordance with one or more embodiments described herein.

FIG. 9 illustrates a flow diagram of an example, non-limiting computer-implemented method that facilitates constrained decision-making and explanation of a recommendation components in accordance with one or more embodiments described herein.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Figure 1:
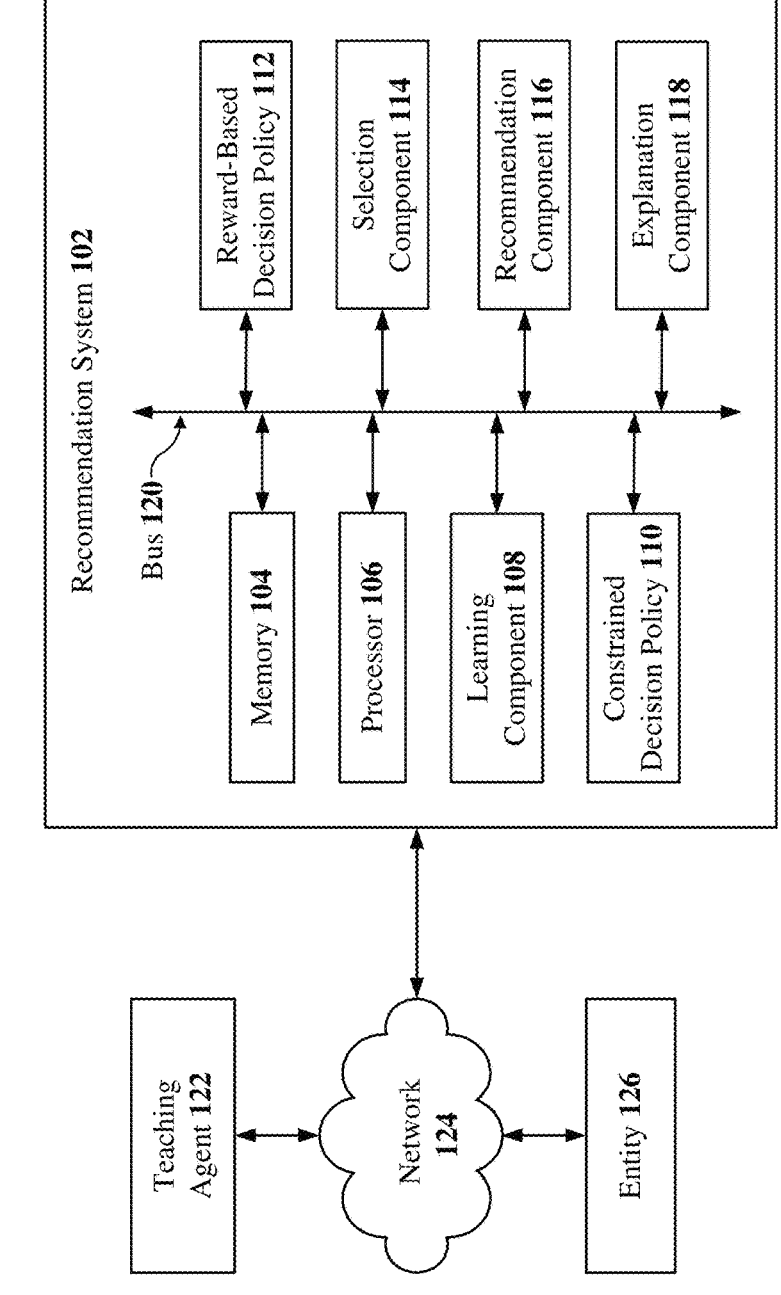
FIG. 1 illustrates a block diagram of an example, non-limiting system that facilitates constrained decision-making and explanation of a recommendation components in accordance with one or more embodiments described herein.

FIG. 1 illustrates a block diagram of an example, non-limiting system 100 that facilitates constrained decision-making and explanation of a recommendation components in accordance with one or more embodiments described herein. According to several embodiments, system 100 can comprise a recommendation system 102. In some embodiments, recommendation system 102 can comprise a memory 104, a processor 106, a learning component 108, one or more constrained decision policies 110, one or more reward-based decision policies 112, a selection component 114, a recommendation component 116, an explanation component 118, and/or a bus 120. In some embodiments, recommendation system 102 can be in communication with one or more teaching agents 122 and/or one or more entities 126, via a network 124.

It should be appreciated that the embodiments of the subject disclosure depicted in various figures disclosed herein are for illustration only, and as such, the architecture of such embodiments are not limited to the systems, devices, and/or components depicted therein. For example, in some embodiments, system 100, recommendation system 102, teaching agent 122, and/or entity 126 can further comprise various computer and/or computing-based elements described herein with reference to operating environment 1000 and FIG. 10. In several embodiments, such computer and/or computing-based elements can be used in connection with implementing one or more of the systems, devices, components, and/or computer-implemented operations shown and described in connection with FIG. 1 or other figures disclosed herein.

According to several embodiments, memory 104 can store one or more computer and/or machine readable, writable, and/or executable components and/or instructions that, when executed by processor 106, can facilitate performance of operations defined by the executable component(s) and/or instruction(s). For example, memory 104 can store computer and/or machine readable, writable, and/or executable components and/or instructions that, when executed by processor 106, can facilitate execution of the various functions described herein relating to recommendation system 102, learning component 108, constrained decision policy 110, reward-based decision policy 112, selection component 114, recommendation component 116, explanation component 118, teaching agent 122, and/or entity 126.

In several embodiments, memory 104 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 104 are described below with reference to system memory 1016 and FIG. 10. Such examples of memory 104 can be employed to implement any embodiments of the subject disclosure.

According to some embodiments, processor 106 can comprise one or more types of processors and/or electronic circuitry that can implement one or more computer and/or machine readable, writable, and/or executable components and/or instructions that can be stored on memory 104. For example, processor 106 can perform various operations that can be specified by such computer and/or machine readable, writable, and/or executable components and/or instructions including, but not limited to, logic, control, input/output (I/O), arithmetic, and/or the like. In some embodiments, processor 106 can comprise one or more central processing unit, multi-core processor, microprocessor, dual micropro-cessors, microcontroller, System on a Chip (SOC), array processor, vector processor, and/or another type of processor.

In some embodiments, recommendation system 102, memory 104, processor 106, learning component 108, constrained decision policy 110, reward-based decision policy 112, selection component 114, recommendation component 116, and/or explanation component 118 can be communicatively, electrically, and/or operatively coupled to one another via a bus 120 to perform functions of system 100, recommendation system 102, and/or any components coupled therewith. In several embodiments, bus 120 can comprise one or more memory bus, memory controller, peripheral bus, external bus, local bus, and/or another type of bus that can employ various bus architectures. Further examples of bus 120 are described below with reference to system bus 1018 and FIG. 10. Such examples of bus 120 can be employed to implement any embodiments of the subject disclosure.

In several embodiments, recommendation system 102 can comprise one or more computer and/or machine readable, writable, and/or executable components and/or instructions that, when executed by processor 106, can facilitate performance of operations defined by such component(s) and/or instruction(s). Further, in numerous embodiments, any component associated with recommendation system 102, as described herein with or without reference to the various figures of the subject disclosure, can comprise one or more computer and/or machine readable, writable, and/or executable components and/or instructions that, when executed by processor 106, can facilitate performance of operations defined by such component(s) and/or instruction(s). For example, learning component 108, constrained decision policy 110, reward-based decision policy 112, selection component 114, recommendation component 116, explanation component 118, and/or any other components associated with recommendation system 102 (e.g., communicatively, electronically, and/or operatively coupled with and/or employed by recommendation system 102), can comprise such computer and/or machine readable, writable, and/or executable component(s) and/or instruction(s). Consequently, according to numerous embodiments, recommendation system 102 and/or any components associated therewith, can employ processor 106 to execute such computer and/or machine readable, writable, and/or executable component(s) and/or instruction(s) to facilitate performance of one or more operations described herein with reference to recommendation system 102 and/or any such components associated therewith.

According to multiple embodiments, recommendation system 102 can facilitate performance of operations executed by and/or associated with learning component 108, constrained decision policy 110, reward-based decision policy 112, selection component 114, recommendation component 116, explanation component 118, teaching agent 122, and/or entity 126. For example, as described in detail below, recommendation system 102 can facilitate: learning a constrained decision policy implicitly, based on a set of example decisions; learning, in an online environment, a reward-based decision policy based on feedback corresponding to a plurality of recommended decisions; selecting a decision policy from one or more decision policies (e.g., constrained decision policy 110, reward-based decision policy 112, etc.), based on a similarity threshold value indicative of a similarity between the constrained decision policy and the decision policy selected; recommending a decision based on the decision policy selected (e.g., constrained decision policy 110, reward-based decision policy 112, a hybrid decision policy, etc.), where the decision complies with one or more constraints of the constrained decision policy; and/or generating an explanation of the decision, where the explanation comprises one or more factors contributing to the decision.

In some embodiments, to facilitate performance of such operations described above, recommendation system 102 and/or components associated therewith (e.g., learning component 108, selection component 114, recommendation component 116, explanation component 118, etc.) can employ one or more heuristic techniques (i.e., a problem solving approach that utilizes a practical method to find a satisfactory solution) to address the exploration-exploitation dilemma in a multi-armed bandit setting (e.g., a constrained contextual multi-armed bandit setting). As referenced herein, exploration can comprise identifying and understanding the reward from an action, while exploitation can comprise gathering as much reward as possible from an action. For example, recommendation system 102, and/or components associated therewith, can employ a Thompson sampling algorithm, such as, for example, a classical Thompson sampling algorithm, and/or variations thereof, to address the exploration-exploitation dilemma in a constrained contextual multi-armed bandit setting. For instance, a variation of the Thompson sampling algorithm that can be employed by multiple embodiments described herein is the constrained Thompson sampling algorithm described below with reference to various components of FIG. 1 and FIG. 2.

In several embodiments, the classical Thompson sampling algorithm and the constrained Thompson sampling algorithm can utilize one or more context vector techniques to execute various operations. For example, such context vector techniques can comprise various mathematical functions (e.g., parametric likelihood function, multivariate Gaussian distribution, etc.) that can be employed to implement such context vectors in a vector space and execute various operations. As referenced herein, a context vector can be a multi-dimensional vector (e.g., d-dimensional vector) comprising components represented as real-valued numbers. In some embodiments, such context vector techniques can facilitate execution of operations based on the geometry of such multi-dimensional vectors in a multi-dimensional vector space. For instance, as described below with reference to selection component 114, the distance (e.g., the normalized Euclidian distance) between two context vectors in a multi-dimensional vector space can indicate a level of similarity between the respective content of such context vectors. For example, a short distance between two context vectors in a multi-dimensional vector space can indicate a high level of similarity between the respective content of such context vectors, while a long distance can indicate a low level of similarity (e.g., a complete lack of similarity) between the respective content of such context vectors.

In some embodiments, learning component 108 can learn one or more decision policies. As referenced herein, a decision policy can comprise one or more rules, courses of action, plans, and/or procedures that dictate or influence decisions made by an entity (e.g., decisions made by a computing device or computing system). In some embodiments, learning component 108 can learn one or more decision policies in an online environment. For example, learning component 108 can learn such decision policies while recommendation system 102 operates in a state of connectivity (e.g., coupled communicatively, operatively, etc.) with a remote computing device and/or computing system via a network (e.g., network 124). In some embodiments, learning component 108 can learn one or more decision policies in an offline environment. For example, learning component 108 can learn such decision policies while recommendation system 102 operates in a disconnected state (e.g., not coupled communicatively, operatively, etc. with a remote computing device and/or computing system via a network).

In some embodiments, learning component 108 can learn one or more decision policies implicitly, based on a set of example decisions. For example, learning component 108 can learn such decision policies implicitly by observing one or more example decisions made by a remote entity (e.g., teaching agent 122, entity 126, etc.). In some embodiments, to facilitate learning such decision policies implicitly, learning component 108 can employ the classical Thompson sampling algorithm. For instance, learning component 108 can employ algorithm 200 depicted in the embodiment illustrated in FIG. 2.

FIG. 2 illustrates an example, non-limiting algorithm 200 that facilitates constrained decision-making and explanation of a recommendation components in accordance with one or more embodiments described herein. In some embodiments, algorithm 200 can comprise a Thompson sampling algorithm (e.g., a classical Thompson sampling algorithm and/or a constrained Thompson sampling algorithm). According to multiple embodiments, recommendation system 102, and/or components associated therewith (e.g., learning component 108, selection component 114, recommendation component 116, explanation component 118, etc.), can facilitate performance of various operations described herein by executing one or more sections of algorithm 200.

Returning to FIG. 1, in several embodiments, learning component 108 can employ algorithm 200 (depicted in the embodiment of FIG. 2) to facilitate learning one or more decision policies implicitly, based on a set of example decisions. In some embodiments, recommendation system 102 and/or learning component 108 can observe such example decisions. For example, recommendation system 102 and/or learning component 108 can observe example decisions made by teaching agent 122. In such an example, teaching agent 122 can comprise an agent acting under constraints. For instance, teaching agent 122 can comprise an entity (e.g., a computing device, a computing system, a human, etc.) executing a decision-making process according to one or more constraints (e.g., ethical constraints, legal constraints, value constraints, preference constraints, moral constraints, professional constraints, etc.).

In several embodiments, such example decisions observed by recommendation system 102 can be formatted in a computer and/or machine readable, writable, and/or executable format and/or a human readable format. For example, such example decisions can comprise real-valued context vectors. In another example, such example decisions can comprise: real-valued decision context vectors; real-valued decisions made by teaching agent 122 based on the real-valued decision context vectors; and/or real-valued rewards observed by teaching agent 122 in response to making such decisions. As referenced herein, a decision context can comprise features of respective decision alternatives that factor into a decision, where decision alternatives can be analogous to the "arms" in a multi-armed bandit setting. As referred to herein, real-valued decision context vectors can describe vectors comprising real-valued elements (e.g., real numbers) that correspond to respective features of a decision context.

In some embodiments, recommendation system 102 and/or learning component 108 can observe such example decisions made by teaching agent 122 by receiving such example decisions from teaching agent 122. For example, recommendation system 102 and/or learning component 108 can receive example decisions from teaching agent 122 via network 124, where such example decisions are formatted as real-valued decision context vectors and real-valued rewards observed by teaching agent 122 in response to making such decisions.

In some embodiments, recommendation system 102 and/or learning component 108 can observe such example decisions made by teaching agent 122 by employing one or more tracking techniques to track teaching agent 122 (e.g., via network 124) and observe the decisions made by teaching agent 122. For example, recommendation system 102 and/or learning component 108 can employ computer tracking software to track teaching agent 122 over network 124 based on an Internet Protocol (IP) address corresponding to teaching agent 122. In some embodiments, recommendation system 102 and/or learning component 108 can observe such example decisions made by teaching agent 122 by employing one or more remote computer access techniques to access teaching agent 122 (e.g., via network 124) and observe the decisions made by teaching agent 122. For example, recommendation system 102 and/or learning component 108 can employ a remote computer desktop access application (e.g., a Virtual Private Network (VPN), etc.) to access teaching agent 122 over network 124 and observe example decisions made by teaching agent 122.

In several embodiments, learning component 108 can learn constrained decision policy 110 implicitly, in an offline environment, based on a set of example decisions (e.g., example decisions made by teaching agent 122 and observed by recommendation system 102 and/or learning component 108, as described above). For example, learning component 108 can observe a set of N<T example decisions (c, k) made by teaching agent 122 (e.g., real-valued decision context vector c(t) and real-valued decision) and can further execute classical Thompson sampling (e.g., via algorithm 200 depicted in the embodiment of FIG. 2) to learn one or more constraints that can constitute constrained decision policy 110. In such an example, to facilitate learning such constraints, learning component 108 can execute (i.e., run) algorithm 200 until convergence, which can result in constrained decision policy 110 symbolized herein as $\mu^e$. In some embodiments, one or more constraints of constrained decision policy 110 can dictate or influence decisions made by recommendation system 102. For instance, such constraints can dictate or influence decisions made by recommendation system 102 in an online environment.

In some embodiments, learning component 108 can learn one or more decision policies explicitly. For example, recommendation system 102 and/or learning component 108 can receive one or more decision policies explicitly from entity 126. In such an example, entity 126 can comprise entities including, but not limited to, a computing device, a computing system, a human, and/or another entity that can interface with recommendation system 102 and/or learning component 108. For instance, in some embodiments, recommendation system 102 and/or learning component 108 can comprise a user interface (e.g., graphical user interface (GUI), form-based interface, natural language interface, command line, documentation GUI, etc.) that facilitates receiving input from entity 126 (e.g., via network 124). In such embodiments, entity 126 can input to recommendation system 102 and/or learning component 108 one or more decision policies. In these embodiments, such receipt of one or more decision policies can constitute learning component 108 learning such decision policies explicitly.

In some embodiments, learning component 108 can learn reward-based decision policy 112, in an online environment, based on feedback corresponding to a plurality of decisions recommended by recommendation system 102 in the online environment. For example, learning component 108 can employ one or more reinforcement learning techniques to learn reward-based decision policy 112, where the rules constituting reward-based decision policy 112 are geared toward maximizing a reward corresponding to a decision recommended by recommendation system 102 (e.g., via recommendation component 116 as described below). In some embodiments, learning component 108 can learn reward-based decision policy 112 in an online environment by employing algorithm 200 of FIG. 2 (e.g., as described below with reference to selection component 114, recommendation component 116, reward component 402, update component 404, and FIG. 4).

According to multiple embodiments, selection component 114 can select a decision policy from one or more decision policies. For example, selection component 114 can select a decision policy from one or more constrained decision policies 110 and/or reward-based decision policy 112. In some embodiments, selection component 114, can select a decision policy from one or more decision policies using a constrained contextual multi-armed bandit setting and a Thompson sampling algorithm (e.g., a constrained Thompson sampling algorithm). For example, selection component 114, can select a decision policy from one or more decision policies using algorithm 200 depicted in the embodiment of FIG. 2.

In some embodiments, selection component 114 can select a decision policy from one or more decision policies while recommendation system 102 operates in an online environment. For example, in an online environment, selection component 114 can select constrained decision policy 110 (e.g., learned offline by learning component 108 as described above) or reward-based decision policy 112 being learned in the online environment (e.g., via learning component 108).

In several embodiments, to facilitate such selection, selection component 114 can execute lines 5-12 of algorithm 200 depicted in the embodiment illustrated in FIG. 2. In some embodiments, selection component 114 can execute lines 5-8 of algorithm 200 to estimate the expected rewards for each arm of a constrained contextual multi-armed bandit setting (e.g., the expected rewards for each decision alternative). In several embodiments, selection component 114 can execute lines 5-9 of algorithm 200 to construct a vector $V_{\bar{\mu}(t)}$ corresponding to reward-based decision policy 112 (algorithm 200, line 7) and a vector $V_{\mu^e(t)}$ corresponding to constrained decision policy 110 (algorithm 200, line 8), where such vectors represent the mean of the distributions for the respective policies at time t (e.g., the expected value from each decision based on the decision context vector c(t)). In some embodiments, selection component 114 can execute line 10 of algorithm 200 to determine the distance between the two vectors $V_{\bar{\mu}(t)}$ and $V_{\mu^e(t)}$ (e.g., selection component 114 can determine the normalized Euclidian distance between the two vectors $V_{\bar{\mu}(t)}$ and $V_{\mu^e(t)}$. In several embodiments, selection component 114 can execute line 10 of algorithm 200 to compare a real-value representing the distance between the two vectors $V_{\bar{\mu}(t)}$ and $V_{\mu^e(t)}$ (e.g., the normalized Euclidian distance) to a real-value representing a similarity threshold value $\sigma$ indicative of the similarity between constrained decision policy 110 and reward-based decision policy 112, where the similarity threshold value $\sigma$ can be input to recommendation system 102 by an entity (e.g., entity 126). In some embodiments, selection component 114 can execute lines 10-12 of algorithm 200 to select constrained decision policy 110 if the real-value representing the distance between the two vectors $V_{\bar{\mu}(t)}$ and $V_{\mu^e(t)}$ is larger than (i.e., greater than) the real-value representing the similarity threshold value $\sigma$. In some embodiments, selection component 114 can execute lines 10-12 of algorithm 200 to select reward-based decision policy 112 if the real-value representing the distance between the two vectors $V_{\bar{\mu}(t)}$ and $V_{\mu^e(t)}$ is smaller than (i.e., less than) the real-value representing the similarity threshold value $\sigma$.

In some embodiments, an entity can set the value of similarity threshold σ. For example, recommendation system 102 and/or selection component 114 can comprise a user interface (e.g., graphical user interface (GUI), form-based interface, natural language interface, command line, documentation GUI, etc.) that can facilitate receiving input from entity 126 (e.g., via network 124). In such an example, entity 126 can input to recommendation system 102 and/or selection component 114 a similarity threshold σ. In some embodiments, similarity threshold σ can comprise a value of σ=0. In such embodiments, selection component 114 can select constrained decision policy 110. In some embodiments, similarity threshold σ can comprise a value of σ=1. In such embodiments, selection component 114 can select reward-based decision policy 112.

According to multiple embodiments, recommendation component 116 can recommend a decision based on one or more decision policies. For example, recommendation component 116 can recommend a decision based on constrained decision policy 110, reward-based decision policy 112, and/or a hybrid decision policy (e.g., hybrid decision policy 304 as described below with reference to blending component 302, hybrid decision policy 304, and FIG. 3).

In some embodiments, recommendation component 116 can recommend a decision based on the decision policy selected by selection component 114 (e.g., as described above). For example, recommendation component 116 can recommend a decision based on reward-based decision policy 112 by executing line 11 of algorithm 200 to determine which decision alternative, based on reward-based decision policy 112, will result in the maximum expected reward (i.e., which arm will result in the maximum expected reward based on reward-based decision policy 112). In another example, recommendation component 116 can recommend a decision based on constrained decision policy 110 by executing line 12 of algorithm 200 to determine which decision alternative, based on constrained decision policy 110, will result in the maximum expected reward (i.e., which arm will result in the maximum expected reward based on constrained decision policy 110).

In some embodiments, the decision recommended by recommendation component 116 can comply with one or more constraints of constrained decision policy 110. For example, in one or more embodiments where selection component 114 selects constrained decision policy 110 (e.g., as described above), recommendation component 116 can recommend a decision that complies with one or more constraints of constrained decision policy 110. In another example, in one or more embodiments where selection component 114 selects reward-based decision policy 112 (e.g., as described above), recommendation component 116 can recommend a decision that complies with one or more constraints of constrained decision policy 110. Specifically, in such embodiments, selection component 114 can select reward-based decision policy 112 based on the normalized Euclidian distance between two vectors $V_{\hat{\mu}(t)}$ and $V_{\mu^e(t)}$ being less than a similarity threshold value σ, which can be indicative of the expected value from each decision based on reward-based decision policy 112 being substantially similar to the expected value from each decision based on constrained decision policy 110. Consequently, in these embodiments, such substantial similarity of such expected values corresponding to the respective decision policies can constitute recommendation component 116 recommending a decision based on one or more constraints of constrained decision policy 110.

In some embodiments, recommendation system 102 and/or recommendation component 116 can actuate the recommended decision and present a result (e.g., analogous to a player pulling a lever of a slot machine in the multi-arm bandit setting). In some embodiments, recommendation system 102 and/or recommendation component 116 can present the recommended decision to an entity (e.g., entity 126). For example, recommendation system 102 and/or recommendation component 116 can present the recommended decision to entity 126, via network 124, by presenting such decision on a GUI rendered on a screen, display, or monitor of a computing device, such as, for example, entity 126. In this example, entity 126 can actuate the recommended decision and observe the result.

In some embodiments, recommendation component 116 can recommend a decision based on one or more decision policies learned by learning component 108 explicitly. For example, as described above with reference to learning component 108, recommendation system 102 can receive (e.g., from entity 126 via network 124 and/or a GUI) one or more constraints explicitly (e.g., an explicit function, rather than a set of example decisions). In some embodiments, constrained decision policy 110 can comprise such explicit constraints. In some embodiments, such explicit constraints can comprise a binary vector $$r_k^e$$

of size k corresponding to respective decision alternatives. In some embodiments, such a binary vector $$r_k^e$$

represents whether for a given decision context recommending a certain decision is allowed or not, based on such explicit constraints (i.e., external rules). In some embodiments, recommendation component 116 can employ the binary vector $$r_k^e$$

as a mask with the expected rewards from reward-based decision policy 112, $V_{\hat{\mu}(t)}$. In some embodiments, recommendation component 116 can employ the binary vector $$r_k^e$$

as a mask by replacing line 10 of algorithm 200 (depicted in the embodiment of FIG. 2) with the $$k(t) = \operatorname{argmax} \ V_{\hat{\mu}(t)} \circ r_k^e.$$

In such embodiments, recommendation component 116 can be prohibited from recommending a decision that is explicitly constrained (i.e., set to 0 value) in the binary vector $$r_k^e.$$

According to multiple embodiments, explanation component 118 can generate an explanation of a decision recommended by recommendation component 116, where the explanation can comprise one or more factors contributing to the decision. For example, based on constrained decision policy 110 (or in some embodiments, reward-based decision policy 112), a decision context vector c(t), and a decision recommended by recommendation component 116, explanation component 118 can determine which feature(s) of the decision context vector c(t) contributed to the decision recommended by recommendation component 116 (i.e., which feature(s) of a decision alternative contributed to the expected reward associated with choosing that decision alternative).

In some embodiments, decision context vector c(t) can comprise a binary vector that can indicate the presence of a certain feature, and constrained decision policy 110

$$(\mu_k^e)$$

can comprise expected rewards of the respective features in decision context vector c(t). In some embodiments, explanation component 118 can generate a feature-wise reward vector $$r_k^e = \mu_k^e \circ c(t)$$

where $\circ$ is the Hadamard product or the element-wise product of the vectors. In some embodiments, explanation component 118 can select the Top K non-zero features of $$r_k^e,$$

which provides a ranking of the most influential features (i.e., most rewarding features) that were used to make the decision based on constrained decision policy 110. In some embodiments, such ranking can constitute an interpretable ranking of the decision context vector c(t) factors based on constrained decision policy 110.

In some embodiments, decision context vector c(t) can comprise a binary vector that can indicate the presence of a certain feature, and reward-based decision policy 112 ($\bar{\mu}_k$) can comprise expected rewards of the respective features in decision context vector c(t). In some embodiments, explanation component 118 can generate a feature-wise reward vector $$r_k^e = \mu_k^e \circ c(t)$$

where $\circ$ is the Hadamard product or the element-wise product of the vectors. In some embodiments, explanation component 118 can select the Top K non-zero features of $r_k$, which provides a ranking of the most influential features (i.e., most rewarding features) that were used to make the decision based on reward-based decision policy 112. In some embodiments, such ranking can constitute an interpretable ranking of the decision context vector c(t) factors based on reward-based decision policy 112.

In some embodiments, recommendation system 102 and/or explanation component 118 can present the explanation to an entity (e.g., entity 126). For example, explanation component 118 can present the explanation to entity 126, via network 124, by presenting such explanation on a GUI rendered on a screen, display, or monitor of a computing device, such as, for example, entity 126. For instance, explanation component 118 can present the explanation in the form of a list of the Top K non-zero features of $$r_k^e$$

or $r_k$, which provide a ranking of the most influential features (i.e., most rewarding features) that were used to make the decision based on constrained decision policy 110 or reward-based decision policy 112, respectively.

In some embodiments, the various components of the system 100 (e.g., recommendation system 102, teaching agent 122, entity 126, etc.) can be coupled (e.g., communicatively, electrically, operatively, etc.) via a data cable (e.g., High-Definition Multimedia Interface (HDMI), recommended standard (RS) 232, Ethernet cable, etc.). In some embodiments, the various components of the system 100 (e.g., recommendation system 102, teaching agent 122, entity 126, etc.) can be coupled (e.g., communicatively, electrically, operatively, etc.) via network 124.

According to multiple embodiments, network 124 can comprise wired and wireless networks, including, but not limited to, a cellular network, a wide area network (WAN) (e.g., the Internet) or a local area network (LAN). For example, recommendation system 102 can communicate with the one or more teaching agents 122 and/or entities 126 (and vice versa) using virtually any desired wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. In such an example, recommendation system 102 can thus include hardware (e.g., a central processing unit (CPU), a transceiver, a decoder), software (e.g., a set of threads, a set of processes, software in execution) or a combination of hardware and software that facilitates communicating information between recommendation system 102 and external systems, sources, and/or devices (e.g., teaching agent 122, entity 126, etc.).

In numerous embodiments, recommendation system 102, teaching agent 122, and/or entity 126 can comprise any type of component, machine, device, facility, apparatus, and/or instrument that comprises a processor and/or can be capable of effective and/or operative communication with a wired and/or wireless network. All such embodiments are envisioned. For example, recommendation system 102, teaching agent 122, and/or entity 126 can comprise a server device, a computing device, a general-purpose computer, a special-purpose computer, a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone, a multimedia players, and/or another type of device.

Figure 3:
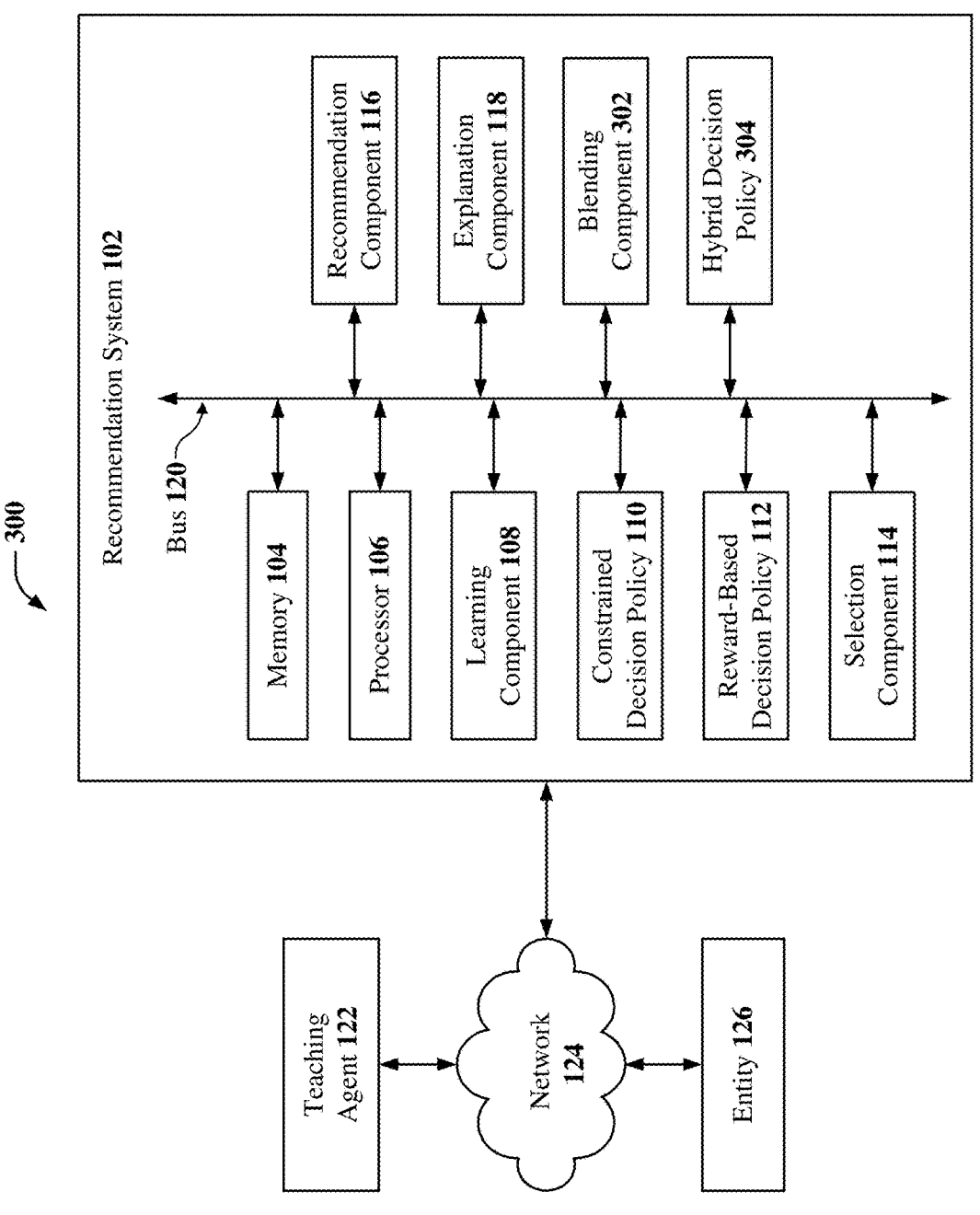
FIG. 3 illustrates a block diagram of an example, non-limiting system that facilitates constrained decision-making and explanation of a recommendation components in accordance with one or more embodiments described herein.

FIG. 3 illustrates a block diagram of an example, non-limiting system 300 that facilitates constrained decision-making and explanation of a recommendation components in accordance with one or more embodiments described herein. Repetitive description of like elements employed in respective embodiments is omitted for sake of brevity. According to several embodiments, system 300 can comprise recommendation system 102. In some embodiments, recommendation system 102 can comprise a blending component 302 and/or one or more hybrid decision policies 304.

According to multiple embodiments, blending component 302 can blend two or more decision policies to generate a hybrid decision policy. For example, blending component 302 can blend constrained decision policy 110 and reward-based decision policy 112 to generate hybrid decision policy 304. In some embodiments, blending component 302 can employ similarity threshold σ as a blending parameter rather than with a distance function as described above with reference to selection component 114 and FIG. 1. In such embodiments, blending component 302 can simply lines 10-12 of algorithm 200 (depicted in the embodiment of FIG. 2) to:

$$k(t) = \operatorname{argmax} \; \sigma \cdot V_{\beta(t)} + (1 - \sigma) \cdot V_{\mu^e(t)}$$

In some embodiments, based on such a simplification of algorithm 200, selection component 114 can select constrained decision policy 110 for similarity threshold σ=0 (e.g., as described above with reference to FIG. 1). In some embodiments, based on such a simplification of algorithm 200, for any similarity threshold σ value other than σ=0, blending component 302 can blend constrained decision policy 110 and reward-based decision policy 112 together to generate hybrid decision policy 304. In some embodiments, such blending functionality of blending component 302 can facilitate a tradeoff between constrained decision policy 110 and reward-based decision policy 112, which can enable recommendation component 116 to recommend a decision based solely on the value of similarity threshold σ and the resulting blend of rewards. In such embodiments, recommendation component 116 can recommend a decision based on hybrid decision policy 304, for example, as described above with reference to recommendation component 116 and FIG. 1.

In some embodiments, an entity can set the value of similarity threshold 6. For example, recommendation system 102 and/or blending component 302 can comprise a user interface (e.g., graphical user interface (GUI), form-based interface, natural language interface, command line, documentation GUI, etc.) that can facilitate receiving input from entity 126 (e.g., via network 124). In such an example, entity 126 can input to recommendation system 102 and/or blending component 302 a similarity threshold σ.

It should be appreciated that the blending functionality of blending component 302, as well as the functionality allowing for an entity (e.g., entity 126) to input a similarity threshold σ to recommendation system 102 and/or blending component 302, can facilitate a tradeoff between the constrained decision policy 110 and reward-based decision policy 112. It should also be appreciated that such a tradeoff between the constrained decision policy 110 and reward-based decision policy 112 enables customization of recommendation system 102 based on an entity's preference (e.g., preference of entity 126), thereby facilitating improved end user experience.

Figure 4:
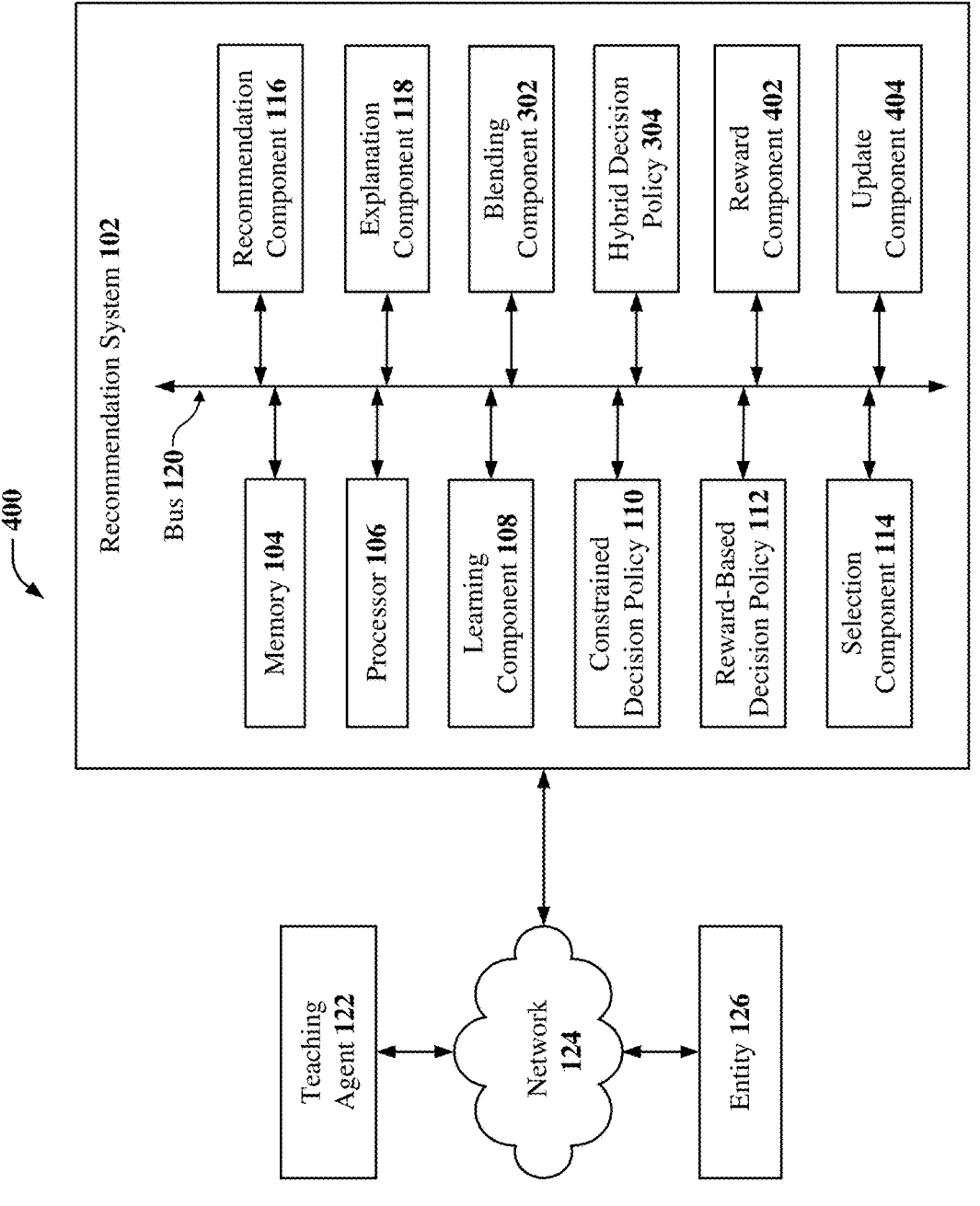
FIG. 4 illustrates a block diagram of an example, non-limiting system that facilitates constrained decision-making and explanation of a recommendation components in accordance with one or more embodiments described herein.

FIG. 4 illustrates a block diagram of an example, non-limiting system 400 that facilitates constrained decision-making and explanation of a recommendation components in accordance with one or more embodiments described herein. Repetitive description of like elements employed in respective embodiments is omitted for sake of brevity. According to several embodiments, system 400 can comprise recommendation system 102. In some embodiments, recommendation system 102 can comprise a reward component 402 and/or an update component 404.

According to multiple embodiments, reward component 402 can be adapted to receive a reward signal from an entity based on a decision recommended by recommendation component 116, where the reward signal is indicative of quality of the decision. For example, reward component 402 can receive a reward signal from entity 126, via network 124 and a GUI that can enable entity 126 to input such a reward signal to recommendation system 102 and/or reward component 402. In such an example, entity 126 can comprise a human (e.g., an end user) operating a computing device (e.g., a general-purpose computer).

In some embodiments, the reward signal can comprise a real-valued number. For instance, the reward signal can comprise 1 reward point out of n possible reward points (e.g., 1 out of 5, 2 out of 5, 3 out of 5, etc.). In several embodiments, recommendation system 102 and/or reward component 402 can observe the reward signal $r_k(t)$ at line 14 of algorithm 200 depicted in the embodiment of FIG. 2.

According to multiple embodiments, update component 404 can update one or more decision policies based on a reward signal indicative of feedback corresponding to decision recommended by recommendation component 116. For example, update component 404 can update reward-based decision policy 112 based on the reward signal that can be received by reward component 402 as described above. In some embodiments, update component 404 can update one or more parameters of the distribution for reward-based decision policy 112. For example, at lines 15-17 of algorithm 200 depicted in the embodiment of FIG. 2, update component 404 can update one or more parameters of the distribution for respective $\tilde{\mu}_k$.

In some embodiments, recommendation system 102 can be a constrained decision-making and explanation of a recommendation system and/or process associated with various technologies. For example, recommendation system 102 can be associated with decision-making technologies, machine learning technologies, reinforcement learning technologies, constrained decision-making technologies, artificial intelligence technologies, and/or other technologies.

In some embodiments, recommendation system 102 can provide technical improvements to systems, devices, components, operational steps, and/or processing steps associated with the various technologies identified above. For example, recommendation system 102 can learn a constrained decision policy implicitly, based only on a set of example decisions, and employ such constrained decision policy as a guide in an online reward-based decision-making setting to recommend decisions that comply with the constrained decision policy, thereby enabling simultaneous maximization of a cumulative reward received based on a recommended decision and compliance with the constrained decision policy. In another example, recommendation system 102 can further generate an explanation of the decision, where the explanation comprises one or more factors contributing to the decision, thereby providing an entity (e.g., an end user) with information that such entity can use to customize one or more aspects of the recommendation system 102 based on such explanation and the entity's preferences. For instance, such an entity can use the information in the explanation to modify the constraint decision policy, the similarity threshold value, and/or input reward signals, all of which can facilitate customizing the functionality of recommendation system 102 based on the entity's preferences.

In some embodiments, recommendation system 102 can provide technical improvements to a processing unit associated with a decision-making system (e.g., a constraint-based decision-making system and/or a reward-based decision-making system). For example, recommendation system 102 can, based on a hybrid decision policy, recommend decisions based on an entity's preferences (e.g., preferences of an end user) that can be input to recommendation system 102 in the form of the similarity threshold value used by recommendation system 102 to generate the hybrid decision policy. In such an example, the customization of the hybrid decision policy based on the customized similarity threshold value enables recommendation system 102 to recommend a decision that accurately reflects an entity's preferences, which facilitates improved processing accuracy of processor 106, resulting in fewer processing cycles, thereby improving processing time, processing efficiency, processing power consumption, and/or processing capacity of processor 106.

In some embodiments, receiving a reward signal from an entity based on a decision recommended by recommendation system 102 and updating one or more parameters of a reward-based decision policy based on such reward signal, can facilitate improved processing accuracy and/or improved processing efficiency associated with processor 106. For example, recommendation system 102 can, based on the reward signal and updated reward-based decision policy, recommend decisions based on an entity's preferences (e.g., preferences of an end user), thereby enabling recommendation system 102 to recommend decisions that accurately reflect an entity's preferences, which facilitates improved processing accuracy of processor 106 with fewer processing cycles. In another example, as recommendation system 102 can update a reward-based decision policy based on such reward signal, recommendation system 102 and/or components associated therewith can recommend a decision that results in a maximum reward in less time, with less processing cycles, thereby improving processing time, processing efficiency, processing power consumption, and/or processing capacity of processor 106.

In some embodiments, recommendation system 102 can employ hardware and/or software to solve problems that are highly technical in nature, that are not abstract and that cannot be performed as a set of mental acts by a human For example, recommendation system 102 can automatically; recommend a decision based on one or more decision policies, wherein the decision complies with one or more constraints of a constrained decision policy; and generate an explanation of the decision, the explanation comprising one or more factors contributing to the decision. In such an example, recommendation system 102 can employ various mathematical functions and/or algorithms (e.g., as illustrated in algorithm 200 depicted in the embodiment of FIG. 2) comprising a multitude of variables, where such mathematical functions and/or algorithms are implemented in a d-dimensional vector space to facilitate execution of the various operations of recommendation system 102 as described herein. Further, recommendation system 102 can blend two or more of such decision policies based on a similarity threshold value that dictates an exact percentage (%) of the respective decision policies that will be included in a hybrid decision policy (e.g., 39% constrained decision policy and 61% reward-based decision policy), where recommendation system 102 can recommend a decision based on the hybrid decision policy comprising such exact percentages of the respective decision policies. In another example, recommendation system 102 can estimate an expected reward corresponding to a decision alternative based on a decision context, where such estimation requires use of complex probability and/or mathematical concepts.

It is to be appreciated that recommendation system 102 can perform a constrained decision-making and explanation of a recommendation process utilizing various combinations of electrical components, mechanical components, and circuitry that cannot be replicated in the mind of a human or performed by a human For example, recommending a decision from a plurality of decision alternatives, in an online environment, based on a multitude of decision context features and several decision policies, which can be blinded by recommendation system 102 based on exact percentage weights, are operations that are greater than the capability of a human mind. For instance, the amount of data processed, the speed of processing such data, and/or the types of data processed by recommendation system 102 over a certain period of time can be greater, faster, and/or different than the amount, speed, and/or data type that can be processed by a human mind over the same period of time.

According to several embodiments, recommendation system 102 can also be fully operational towards performing one or more other functions (e.g., fully powered on, fully executed, etc.) while also performing the above-referenced virtual motion sensor data generation process. It should be appreciated that such simultaneous multi-operational execution is beyond the capability of a human mind. It should also be appreciated that recommendation system 102 can include information that is impossible to obtain manually by an entity, such as a human user. For example, the type, amount, and/or variety of information included in learning component 108, constrained decision policy 110, reward-based decision policy 112, selection component 114, recommendation component 116, explanation component 118, teaching agent 122, entity 126, algorithm 200, blending component 302, hybrid decision policy 304, reward component 402, and/or update component 404 can be more complex than information obtained manually by a human user.

Figure 5:
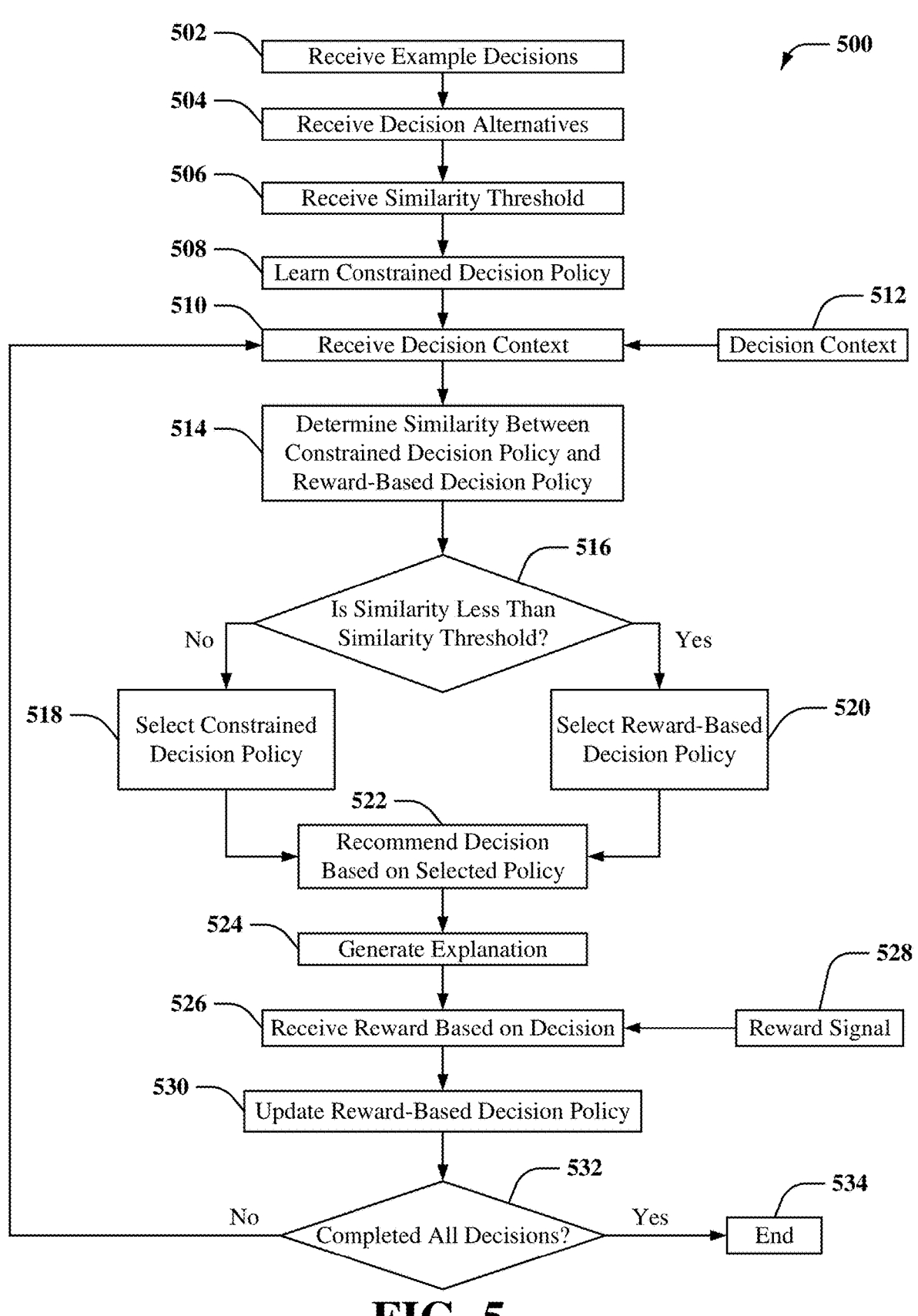
FIG. 5 illustrates a flow diagram of an example, non-limiting computer-implemented method that facilitates constrained decision-making and explanation of a recommendation components in accordance with one or more embodiments described herein.

FIG. 5 illustrates a flow diagram of an example, non-limiting computer-implemented method 500 that facilitates constrained decision-making and explanation of a recommendation components in accordance with one or more embodiments described herein. Repetitive description of like elements employed in respective embodiments is omitted for sake of brevity.

According to multiple embodiments, recommendation system 102 can receive, at 502, example decisions. For example, at 502, recommendation system 102 can observe (receive), in an offline environment, a set of $N<T$ example decisions (c,k) made by teaching agent 122 (e.g., real-valued decision context vector c(t) and real-valued decision), as described above with reference to learning component 108 and FIG. 1.

In several embodiments, recommendation system 102 can receive, at 504, decision alternatives, where such decision alternatives can represent the set of alternatives recommendation system 102 can choose between (e.g., the decision alternatives from which recommendation component 116 can recommend a decision). For example, at 504, recommendation system 102 can receive such decision alternatives in an offline environment.

In some embodiments, recommendation system 102 can receive, at 506, a similarity threshold σ. In some embodiments, at 506, an entity can set the value of similarity threshold σ. For example, at 506, recommendation system 102 can comprise a user interface (e.g., graphical user interface (GUI), form-based interface, natural language interface, command line, documentation GUI, etc.) that can facilitate receiving input from entity 126 (e.g., via network 124). In such an example, at 506, entity 126 can input to recommendation system 102 a similarity threshold σ. For example, at 506, recommendation system 102 can receive a similarity threshold σ comprising a value in (0, 1). For instance, at 506, recommendation system 102 can receive a similarity threshold σ comprising a value of σ=0 or σ=1. In some embodiments, at 506, such similarity threshold σ can be employed at 516 to facilitate selecting a decision policy (e.g., constrained decision policy 110 or reward-based decision policy 112), for example, as described above with reference to selection component 114 and FIG. 1. In such embodiments, at 506, a similarity threshold σ value of σ=0 can result in selection of constrained decision policy 110, while a similarity threshold σ value of σ=1 can result in selection of reward-based decision policy 112.

In several embodiments, recommendation system 102 can learn, at 508, a constrained decision policy. For example, at 508, recommendation system 102 can learn constrained decision policy 110, based on observing (receiving) the example decisions at 502. In some embodiments, at 508, recommendation system 102 can employ learning component 108 to learn constrained decision policy 110 at 508 based on observing (receiving) the example decisions at 502 (e.g., as described above with reference to learning component 108 and FIG. 1). For instance, at 508, recommendation system 102 can employ learning component 108 to learn constrained decision policy 110 implicitly at 508 by executing (running) a classical Thompson sampling algorithm (e.g., algorithm 200 depicted in the embodiment of FIG. 2) until convergence on the set of example decisions.

In some embodiments, recommendation system 102 can receive, at 510, a decision context. For example, at 510, recommendation system 102 can receive, in an online environment, a decision context 512. In such an example, at 510, decision context 512 can comprise a real-valued decision context vector (e.g., decision context c(t) of algorithm 200 depicted in the embodiment of FIG. 2). For instance, at 510, for every decision to be made, recommendation system 102 can receive, via network 124, a decision context vector comprising a d-dimensional vector, where respective elements of such vector are represented by real numbers.

In several embodiments, recommendation system 102 can determine, at 514, the similarity between a constrained decision policy and a reward-based decision policy. For example, at 514, recommendation system 102 can determine the similarity between constrained decision policy 110 and reward-based decision policy 112 at 514. In some embodiments, at 514, to determine such similarity, recommendation system 102 can employ selection component 114 to execute (run) lines 5-9 of algorithm 200 depicted in the embodiment of FIG. 2 to determine the expected value from respective decision alternatives received at 504, based on decision context 512 received at 510. In some embodiments, at 514, recommendation system 102 can employ selection component 114 to execute lines 5-9 of algorithm 200 to construct a vector $V_{\tilde{\mu}(t)}$ corresponding to reward-based decision policy 112 (algorithm 200, line 7) and a vector $V_{\mu^e(t)}$ corresponding to constrained decision policy 110 (algorithm 200, line 8), where such vectors represent the mean of the distributions for the respective policies at time t (e.g., the expected value from each decision based on decision context 512). In some embodiments, at 514, recommendation system 102 can employ selection component 114 to execute line 10 of algorithm 200 to determine the distance between the two vectors $V_{\tilde{\mu}(t)}$ and $V_{\mu^e(t)}$ (e.g., selection component 114 can determine the normalized Euclidian distance between the two vectors $V_{\tilde{\mu}(t)}$ and $V_{\mu^e(t)}$. In several embodiments, at 514, recommendation system 102 can employ selection component 114 to execute line 10 of algorithm 200 to compare a real-value representing the distance between the two vectors $V_{\tilde{\mu}(t)}$ and $V_{\mu^e(t)}$ (e.g., the normalized Euclidian distance) to a real-value representing similarity threshold value σ received at 506.

In some embodiments, recommendation system 102 can determine, at 516, whether the similarity determined at 514 is less than similarity threshold σ received at 506, where such determination at 516 can dictate which decision policy to select (e.g., constrained decision policy 110 at 518 or reward-based decision policy at 520). For example, at 516, recommendation system 102 can employ selection component 114 to execute lines 10-12 of algorithm 200 (depicted in the embodiment of FIG. 2) to select constrained decision policy 110 at 518 if the real-value representing the distance between the two vectors $V_{\tilde{\mu}(t)}$ and $V_{\mu^e(t)}$ is larger than (i.e., greater than) the real-value representing the similarity threshold value σ received at 506. In some embodiments, at 516, selection component 114 can execute lines 10-12 of algorithm 200 to select reward-based decision policy 112 at 520 if the real-value representing the distance between the two vectors $V_{\tilde{\mu}(t)}$ and $V_{\mu^e(t)}$ is smaller than (i.e., less than) the real-value representing the similarity threshold value σ received at 506.

In several embodiments, recommendation system 102 can recommend, at 522, a decision based on the decision policy selected at 516. For instance, at 522, recommendation system 102 can employ recommendation component 116 to recommend a decision based on the decision policy selected at 516 (e.g., constrained decision policy 110 at 518 or reward-based decision policy at 520). For example, at 522, recommendation component 116 can recommend a decision based on reward-based decision policy 112 selected at 520 by executing line 11 of algorithm 200 (depicted in the embodiment of FIG. 2) to determine which decision alternative received at 504 will result in the maximum expected reward, based on reward-based decision policy 112 (i.e., which arm will result in the maximum expected reward based on reward-based decision policy 112). In another example, at 522, recommendation component 116 can recommend a decision based on constrained decision policy 110 selected at 518 by executing line 12 of algorithm 200 to determine which decision alternative received at 504 will result in the maximum expected reward, based on constrained decision policy 110 (i.e., which arm will result in the maximum expected reward based on constrained decision policy 110).

In some embodiments, recommendation system 102 can output, at 522, the decision recommended at 522. For example, at 522, recommendation system 102 can employ recommendation component 116 to actuate the decision recommended at 522 and present a result (e.g., analogous to a player pulling a lever of a slot machine in the multi-arm bandit setting). In another example, at 522, recommendation component 116 can present the decision recommended at 522 to an entity (e.g., entity 126). For instance, at 522, recommendation component 116 can present the recommended decision to entity 126, via network 124, by presenting such decision on a GUI rendered on a screen, display, or monitor of a computing device, such as, for example, entity 126. In this example, at 522, entity 126 can actuate the decision recommended at 522 and observe the result.

In some embodiments, recommendation system 102 can generate, at 524, an explanation of the decision recommended at 522. For example, at 524, recommendation system 102 can employ explanation component 118 to generate an explanation of the decision recommended at 522. In some embodiments, at 524, explanation component 118 can generate an explanation of the decision recommended at 522, where the explanation can comprise one or more factors contributing to the decision. For example, at 524, based on the decision policy selected at steps 516 to 520, the decision context 512 received at 510, and the decision recommended at 522, explanation component 118 can determine which feature(s) of decision context 512 contributed to the decision recommended at 522 (i.e., which feature(s) of a decision alternative received at 504 contributed to the expected reward associated with choosing that decision alternative).

In some embodiments, at 524, decision context 512 can comprise a binary vector that can indicate the presence of a certain feature, and constrained decision policy 110

$$(\mu_k^e)$$

can comprise expected rewards of the respective features in decision context 512. In some embodiments, at 524, explanation component 118 can generate a feature-wise reward vector $$r_k^e = \mu_k^e \circ c(t)$$

where $\circ$ is the Hadamard product or the element-wise product of the vectors. In some embodiments, at 524, explanation component 118 can select the Top K non-zero features of $$r_k^e,$$

which provides a ranking of the most influential features (i.e., most rewarding features) that were used to make the decision at 522 based on constrained decision policy 110. In some embodiments, at 524, such ranking can constitute an interpretable ranking of the decision context 512 factors based on constrained decision policy 110.

In some embodiments, at 524, decision context 512 can comprise a binary vector that can indicate the presence of a certain feature, and reward-based decision policy 112 ($\tilde{\mu}_k$)

can comprise expected rewards of the respective features in decision context 512. In some embodiments, at 524, explanation component 118 can generate a feature-wise reward vector $$r_k^e = \mu_k^e \circ c(t)$$

where $\circ$ is the Hadamard product or the element-wise product of the vectors. In some embodiments, at 524, explanation component 118 can select the Top K non-zero features of $r_k$, which provides a ranking of the most influential features (i.e., most rewarding features) that were used to make the decision at 522 based on reward-based decision policy 112. In some embodiments, at 524, such ranking can constitute an interpretable ranking of the decision context 512 factors based on reward-based decision policy 112.

In some embodiments, at 524, recommendation system 102 and/or explanation component 118 can present the explanation to an entity (e.g., entity 126). For example, at 524, explanation component 118 can present the explanation to entity 126, via network 124, by presenting such explanation on a GUI rendered on a screen, display, or monitor of a computing device, such as, for example, entity 126. For instance, at 524, explanation component 118 can present the explanation in the form of a list of the Top K non-zero features of $$r_k^e$$

or $r_k$, which provide a ranking of the most influential features (i.e., most rewarding features) that were used to make the decision based on constrained decision policy 110 or reward-based decision policy 112, respectively.

In several embodiments, recommendation system 102 can receive, at 526, a reward based on the decision recommended at 522. For example, at 526, recommendation system 102 can receive, in an online environment, a reward signal 528, where such reward signal 528 is indicative of quality of the decision recommended at 522. In such an example, at 526, reward signal 528 can comprise a real-valued number (e.g., reward signal 528 can comprise 1 reward point out of n possible reward points, such as, for example, 1 out of 5, 2 out of 5, 3 out of 5, etc.). In some embodiments, at 526, recommendation system 102 can employ reward component 402 to receive reward signal 528 based on the decision recommended at 522. For instance, at 526, recommendation system 102 can employ reward component 402 to receive reward signal 528, for example, as described above with reference to reward component 402 and FIG. 4.

In some embodiments, recommendation system 102 can update, at 530, a reward-based decision policy. For example, at 530, recommendation system 102 can update reward-based decision policy 112 based on reward signal 528 received at 526. In some embodiments, at 530, recommendation system 102 can employ update component 404 to update reward-based decision policy 112 based on reward signal 528 received at 526. For instance, at 530, recommendation system 102 can employ update component 404 to update reward-based decision policy 112, for example, as described above with reference to update component 404 and FIG. 4.

In several embodiments, recommendation system 102 can determine, at 532, whether all decisions have been completed. In some embodiments, at 532, if recommendation system 102 determines all decisions have been completed, method 500 proceeds to end at 534. In some embodiments, at 532, if recommendation system 102 determines all decisions have not been completed, method 500 returns to receive decision context at 510 and repeats steps 510 to 532 until recommendation system 102 determines at 532 that all decisions have been completed.

Figure 6:
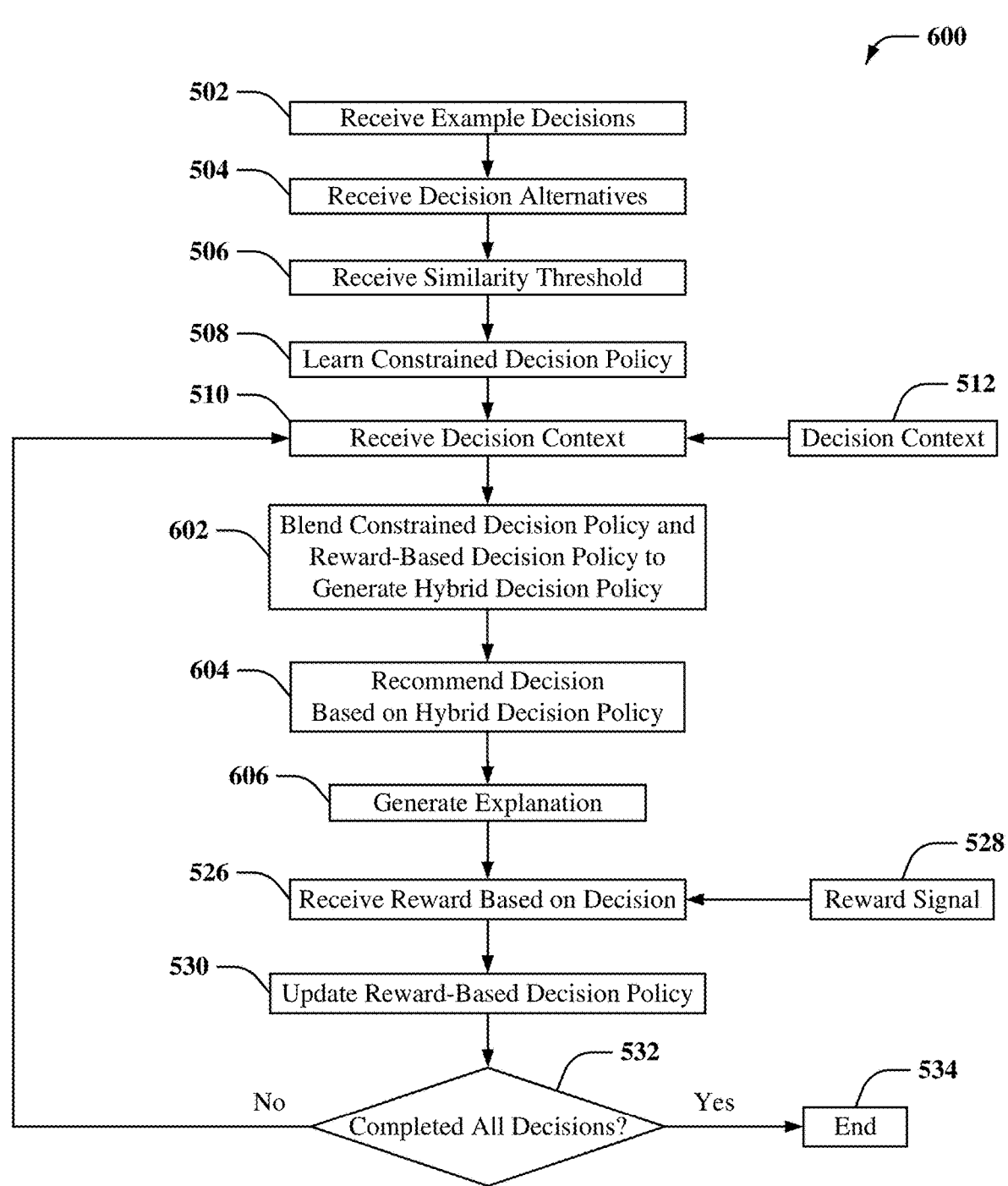
FIG. 6 illustrates a flow diagram of an example, non-limiting computer-implemented method that facilitates constrained decision-making and explanation of a recommendation components in accordance with one or more embodiments described herein.

FIG. 6 illustrates a flow diagram of an example, non-limiting computer-implemented method 600 that facilitates constrained decision-making and explanation of a recommendation components in accordance with one or more embodiments described herein. Repetitive description of like elements employed in respective embodiments is omitted for sake of brevity. Specifically, repetitive description of steps 502 to 512 and steps 524 to 534 described above with reference to FIG. 5 are omitted here for sake of brevity.

According to multiple embodiments, recommendation system 102 can blend, at 602, a constrained decision policy and a reward-based decision policy to generate a hybrid decision policy. For example, at 602, recommendation system 102 can blend constrained decision policy 110 and reward-based decision policy 112 to generate hybrid decision policy 304. In some embodiments, at 602, recommendation system 102 can employ blending component 302 to blend constrained decision policy 110 and reward-based decision policy 112 to generate hybrid decision policy 304 (e.g., as described above with reference to blending component 302 and FIG. 3). In some embodiments, at 602, blending component 302 can employ similarity threshold σ received at 506 as a blending parameter rather than with a distance function as described above with reference to selection component 114 and FIG. 1. In such embodiments, at 602, blending component 302 can simply lines 10-12 of algorithm 200 (depicted in the embodiment of FIG. 2) to:

$$k(t) = \text{argmax } \sigma \cdot V_{\bar{\mu}(t)} + (1 - \sigma) \cdot V_{\mu^\varepsilon(t)}$$

In some embodiments, at 602, based on such a simplification of algorithm 200, selection component 114 can select constrained decision policy 110 for similarity threshold σ=0 (e.g., as described above with reference to FIG. 1). In some embodiments, at 602, based on such a simplification of algorithm 200, for any similarity threshold σ value other than σ=0, blending component 302 can blend constrained decision policy 110 and reward-based decision policy 112 together to generate hybrid decision policy 304.

In some embodiments, at 604, such blending functionality of blending component 302 can facilitate a tradeoff between constrained decision policy 110 and reward-based decision policy 112, which can enable recommendation system 102 and/or recommendation component 116 to recommend a decision based solely on the value of similarity threshold σ received at 506 and the resulting blend of rewards. In such embodiments, at 604, recommendation component 116 can recommend a decision based on hybrid decision policy 304, for example, as described above with reference to recommendation component 116 and FIG. 1.

In some embodiments, recommendation system 102 can generate, at 606, an explanation of the decision recommended at 604. For example, at 606, recommendation system 102 can employ explanation component 118 to generate an explanation of the decision recommended at 604

(e.g., as described above with reference to explanation component 118 and FIG. 3). In some embodiments, at 606, explanation component 118 can generate an explanation of the decision recommended at 604, where the explanation can comprise one or more factors contributing to the decision. For example, at 606, based on hybrid decision policy 304, the decision context 512 received at 510, and the decision recommended at 604, explanation component 118 can determine which feature(s) of decision context 512 contributed to the decision recommended at 604 (i.e., which feature(s) of a decision alternative received at 504 contributed to the expected reward associated with choosing that decision alternative based on hybrid decision policy 304).

Figure 7:
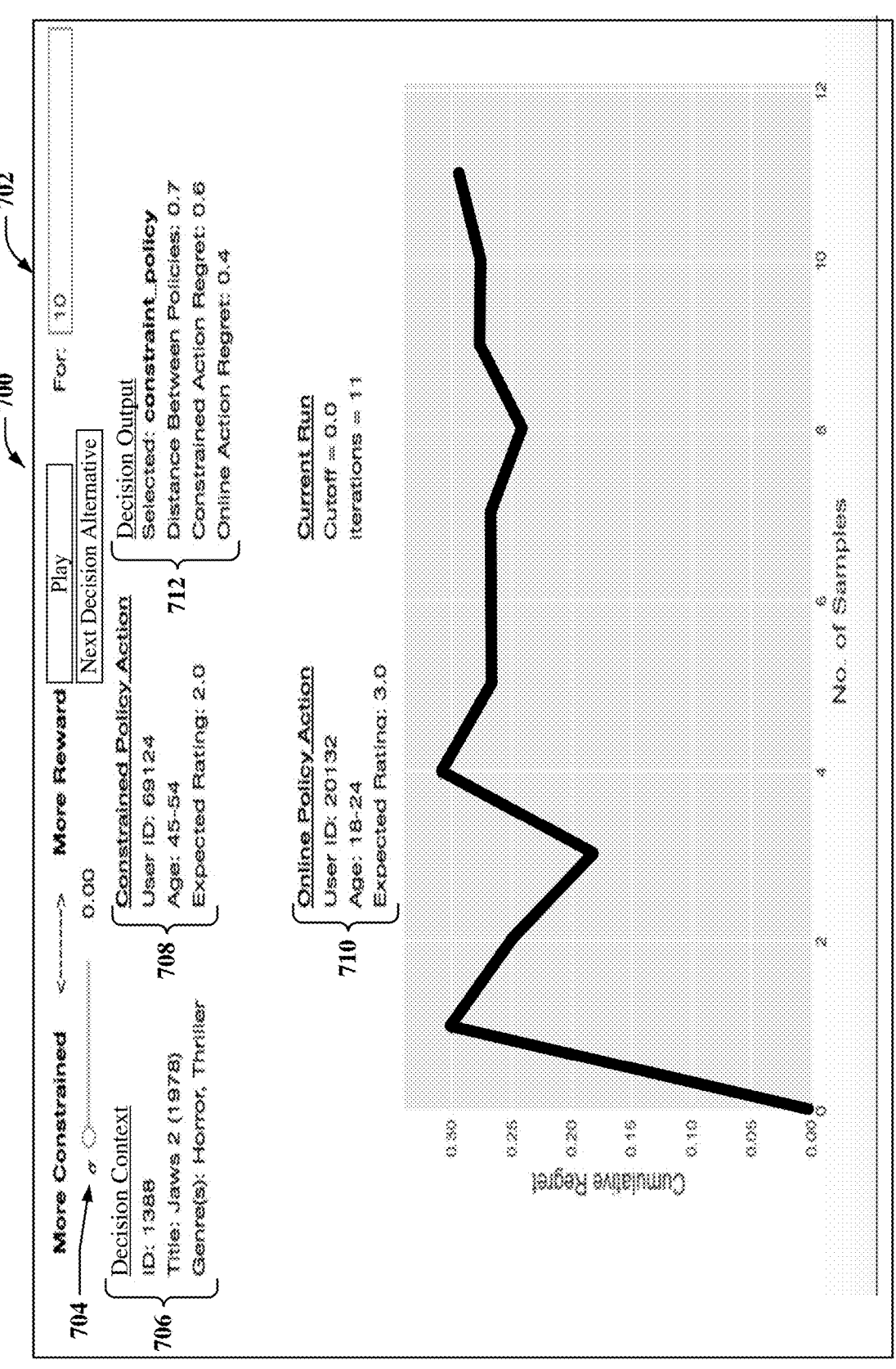
FIG. 7 illustrates an example, non-limiting system that facilitates constrained decision-making and explanation of a recommendation components in accordance with one or more embodiments described herein.

FIG. 7 illustrates an example, non-limiting system 700 that facilitates constrained decision-making and explanation of a recommendation components in accordance with one or more embodiments described herein. Repetitive description of like elements employed in respective embodiments is omitted for sake of brevity. According to several embodiments, system 700 can comprise user interface 702. In some embodiments, user interface 702 can comprise a similarity threshold 704, a decision context 706, a constrained policy action 708, an online policy action 710, and/or a decision output 712.

According to multiple embodiments, user interface 702 can comprise a graphical user interface (GUI) of recommendation system 102 that can facilitate an interface with entity 126. For example, user interface 702 can comprise the GUI described above with reference to FIG. 1 and FIG. 3 to FIG. 6. In several embodiments, user interface 702 can comprise one or more components of recommendation system 102. In some embodiments, user interface 702 can comprise similarity threshold 704, which can comprise similarity threshold σ described above with reference to FIG. 1 and FIG. 3 to FIG. 6. In some embodiments, user interface 702 can comprise decision context 706, which can comprise decision context c(t) described above with reference to FIG. 1 and FIG. 3 to FIG. 6. In some embodiments, user interface 702 can comprise constrained policy action 708, which can comprise constrained decision policy 110 described above with reference to FIG. 1 and FIG. 3 to FIG. 6. In some embodiments, user interface 702 can comprise online policy action 710, which can comprise reward-based decision policy 112 described above with reference to FIG. 1 and FIG. 3 to FIG. 6. In some embodiments, user interface 702 can comprise decision output 712, which can comprise several components of recommendation system 102 described above with reference to FIG. 1 and FIG. 3 to FIG. 6. For example, decision output 712 can comprise the decision policy selected by selection component 114. In another example, decision output 712 can comprise the distance between the two vectors $V_{\bar{\mu}(t)}$ and $V_{\mu^s(t)}$ (e.g., the normalized Euclidian distance between the two vectors $V_{\bar{\mu}(t)}$ and $V_{\mu^\varepsilon(t)}$.

FIG. 8 illustrates a flow diagram of an example, non-limiting computer-implemented method 800 that facilitates constrained decision-making and explanation of a recommendation components in accordance with one or more embodiments described herein. Repetitive description of like elements employed in other embodiments described herein is omitted for sake of brevity.

At 802, learning, by a system (e.g., via recommendation system 102 and/or learning component 108) operatively coupled to a processor (e.g., processor 106), a constrained decision policy (e.g., constrained decision policy 110) implicitly, based on a set of example decisions (e.g., example decisions made by teaching agent 122 and observed by recommendation system 102 and/or learning component 108, as described above with reference to FIG. 1).

At 804, learning, by the system (e.g., via recommendation system 102 and/or learning component 108), in an online environment (e.g., the Internet via network 124), a reward-based decision policy (e.g., reward-based decision policy 112) based on feedback corresponding to a plurality of recommended decisions (e.g., based on reward signal from entity 126 as described above with reference to FIG. 1).

At 806, selecting, by the system (e.g., via recommendation system 102 and/or selection component 114), the constrained decision policy or the reward-based decision policy, based on a similarity threshold value (e.g., similarity threshold value σ) indicative of a similarity between the constrained decision policy and the reward-based decision policy, using a constrained contextual multi-armed bandit setting (e.g., as described above with reference to FIG. 1).

At 808, recommending, by the system (e.g., via recommendation system 102 and/or recommendation component 116), a decision based on the selected decision policy, wherein the decision complies with one or more constraints of the constrained decision policy.

At 810, generating, by the system (e.g., via recommendation system 102 and/or explanation component 118), an explanation of the decision, the explanation comprising one or more factors contributing to the decision (e.g., decision context features).

FIG. 9 illustrates a flow diagram of an example, non-limiting computer-implemented method 900 that facilitates constrained decision-making and explanation of a recommendation components in accordance with one or more embodiments described herein. Repetitive description of like elements employed in other embodiments described herein is omitted for sake of brevity.

At 902, learning, by a system (e.g., via recommendation system 102 and/or learning component 108) operatively coupled to a processor (e.g., processor 106), a constrained decision policy (e.g., constrained decision policy 110) implicitly, based on a set of example decisions (e.g., example decisions made by teaching agent 122 and observed by recommendation system 102 and/or learning component 108, as described above with reference to FIG. 1).

At 904, learning, by the system (e.g., via recommendation system 102 and/or learning component 108), in an online environment (e.g., the Internet via network 124), a reward-based decision policy (e.g., reward-based decision policy 112) based on feedback corresponding to a plurality of recommended decisions (e.g., based on reward signal from entity 126 as described above with reference to FIG. 1).

At 906, blending, by the system (e.g., via recommendation system 102 and/or blending component 302), the constrained decision policy and the reward-based decision policy to generate a hybrid decision policy (e.g., hybrid decision policy 304). In some embodiments, such blending method can facilitate improved processing accuracy, improved processing efficiency, and/or improved processing time associated with processor 106. For example, recommendation system 102 and/or components associated therewith can, based on hybrid decision policy 304, recommend decisions based on an entity's preferences (e.g., preferences of entity 126), thereby enabling recommendation system 102 to recommend a decision that accurately reflects an entity's preferences, which facilitates improved processing accuracy of processor 106 with fewer processing cycles. In another example, recommendation system 102 and/or components associated therewith can, based on hybrid decision policy 304, recommend a decision that results in a maximum reward in less time, with less processing cycles, thereby improving processing time, processing efficiency, processing power consumption, and/or processing capacity of processor 106.

At 908, recommending, by the system (e.g., via recommendation system 102 and/or recommendation component 116), a decision based on the hybrid decision policy, wherein the decision complies with one or more constraints of the constrained decision policy (e.g., as described above with reference to FIG. 3).

At 910, generating, by the system (e.g., via recommendation system 102 and/or explanation component 118), an explanation of the decision, the explanation comprising one or more factors contributing to the decision (e.g., decision context features).

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 10:
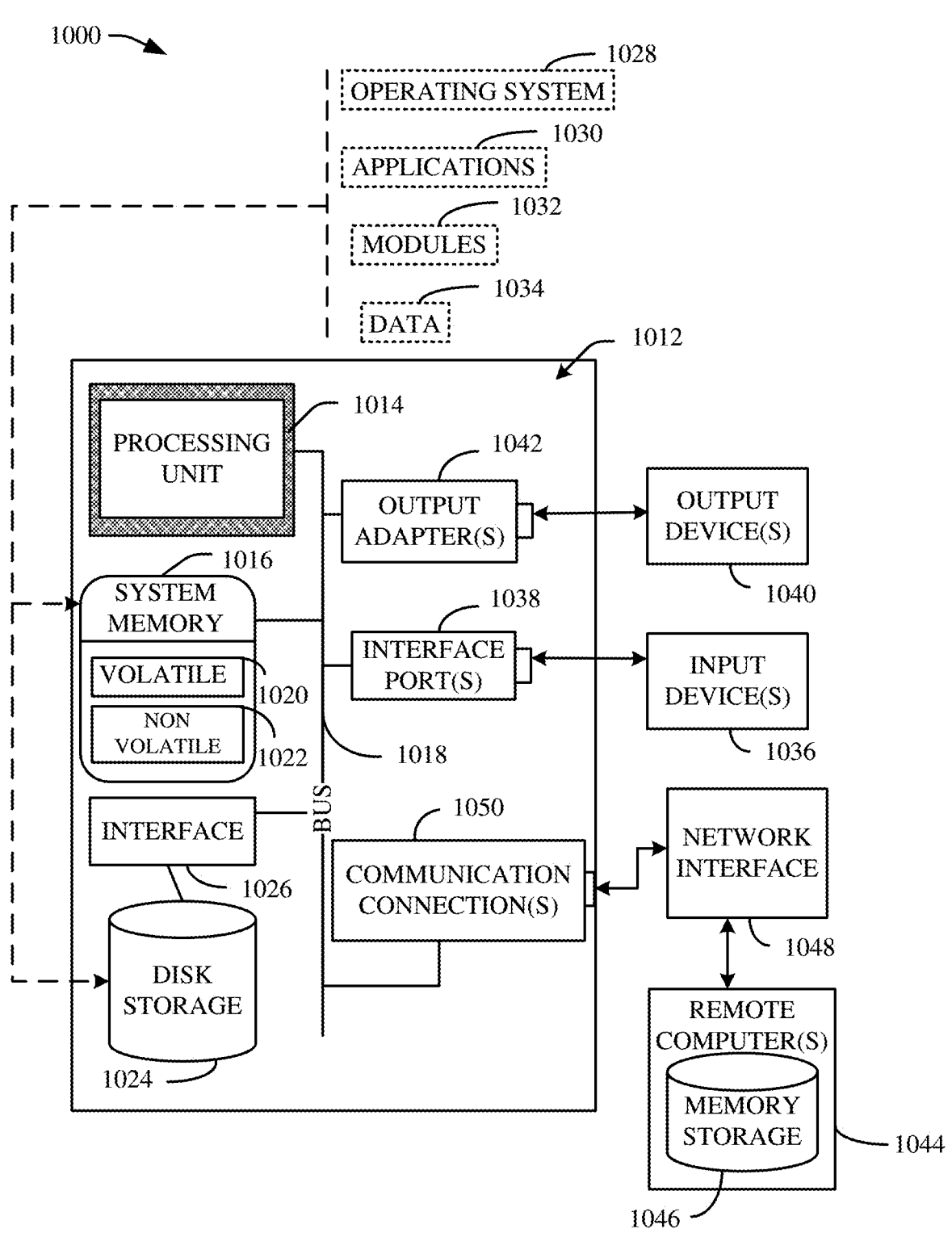
FIG. 10 illustrates a block diagram of an example, non-limiting operating environment in which one or more embodiments described herein can be facilitated.

In order to provide a context for the various aspects of the disclosed subject matter, FIG. 10 as well as the following discussion are intended to provide a general description of a suitable environment in which the various aspects of the disclosed subject matter can be implemented. FIG. 10 illustrates a block diagram of an example, non-limiting operating environment in which one or more embodiments described herein can be facilitated. Repetitive description of like elements employed in other embodiments described herein is omitted for sake of brevity.

With reference to FIG. 10, a suitable operating environment 1000 for implementing various aspects of this disclosure can also include a computer 1012. The computer 1012 can also include a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1016 can also include volatile memory 1020 and nonvolatile memory 1022. The basic input/output system (BIOS), containing the basic routines to transfer information between elements within the computer 1012, such as during start-up, is stored in nonvolatile memory 1022. Computer 1012 can also include removable/non-removable, volatile/non-volatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media. To facilitate connection of the disk storage 1024 to the system bus 1018, a removable or non-removable interface is typically used, such as interface 1026. FIG. 10 also depicts software that acts as an intermediary between users and the basic computer resources described in the suitable operating environment 1000. Such software can also include, for example, an operating system 1028. Operating system 1028, which can be stored on disk storage 1024, acts to control and allocate resources of the computer 1012.

System applications 1030 take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port can be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DR- RAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
training, by a system operatively coupled to a processor, a machine learning process to make decisions in response to receiving a decision context vector that represents a respective decision context, wherein the training comprises the machine learning process learning to make the decisions based on a constrained decision policy learned by the machine learning process observing one or more teaching agents that are not the machine learning process; and
further training, by the system, the machine learning process to:
learn a reward-based decision policy by using reinforcement learning techniques and electronic feedback that is received in response to respective decisions recommended by the machine learning process implementing the reward-based decision policy,
choose between the constrained decision policy and the reward-based decision policy to employ by the machine learning process in recommending a decision, wherein the choosing comprises:
receiving a context vector representing a new decision context,
generating, using constrained Thompson sampling, a first expected rewards vector representing an output of the constrained decision policy based on the context vector as an input,
generating, using the constrained Thompson sampling, a second expected rewards vector representing an output of the reward-based decision policy based on the context vector as an input,
performing the choosing between the constrained decision policy and the reward-based decision policy based on a difference between the first expected rewards vector and the second expected rewards vector, wherein performing the choosing comprises:

in response to the difference between the first expected rewards vector and the second expected rewards vector being greater than a similarity threshold, employing, by the machine learning process, the constrained decision policy for generating the decision based on the context vector, and in response to the difference between the first expected rewards vector and the second expected rewards vector not being greater than the similarity threshold, employing, by the machine learning process, the reward-based decision policy for generating the decision based on the context vector, generate an explanation of the decision, the explanation comprising one or more factors contributing to the decision, electronically displaying, by the system, the recommended decision and the explanation on the decision via a graphical user interface operably coupled to the system, wherein the explanation comprises an electronic visual list of a ranking of a number of most influential features employed to make the decision based on the constrained decision policy or the reward-based decision policy, and retraining, by the system, the machine learning process by updating the reward-based policy based on a reward signal indicative of the electronic feedback that is received in response to respective decisions recommended by the machine learning process using the constrained decision policy and the reward-based decision policy.

2. The computer-implemented method of claim 1, wherein the observing of the one or more teaching agents that are not the machine learning process occurs over a network and obtains a set of example decisions.

3. The computer-implemented method of claim 1, wherein the choosing between the constrained decision policy and the reward-based decision policy further employs a constrained contextual multi-armed bandit setting.

4. The computer-implemented method of claim 1, wherein the training of the machine learning process to learn the constrained decision policy comprises training implicitly using classical Thompson sampling.

5. The computer-implemented method of claim 1, wherein the reward signal is received from an entity and indicates a quality of the decision.

6. The computer-implemented method of claim 1, wherein the constrained decision policy is a first constrained decision policy, and wherein the machine learning process further learns a second constrained decision policy, and learns to choose between the first constrained decision policy, the second constrained decision policy, and the rewards-based decision policy.

7. The computer-implemented method of claim 1, wherein the constrained decision policy is selected from a group consisting of: an ethical decision policy; a legal decision policy; a value decision policy; and a preference decision policy.

8. A computer program product comprising a computer readable storage medium having program instructions embodied therewith, the program instructions executable by a processor to cause the processor to perform operations comprising:

training a machine learning process to make decisions in response to receiving a decision context vector that represents a respective decision context, wherein the training comprises the machine learning process learning to make the decisions based on a constrained decision policy learned by the machine learning process observing one or more teaching agents that are not the machine learning process; and further training the machine learning process to:

learn a reward-based decision policy by using reinforcement learning techniques and electronic feedback that is received in response to respective decisions recommended by the machine learning process implementing the reward-based decision policy, and choose between the constrained decision policy and the reward-based decision policy to employ by the machine learning process in recommending a decision, wherein the choosing comprises:

receiving a context vector representing a new decision context, generating, using constrained Thompson sampling, a first expected rewards vector representing an output of the constrained decision policy based on the context vector as an input, generating, using the constrained Thompson sampling, a second expected rewards vector representing an output of the reward-based decision policy based on the context vector as an input, performing the choosing between the constrained decision policy and the reward-based decision policy based on a difference between the first expected rewards vector and the second expected rewards vector, wherein performing the choosing comprises:

in response to the difference between the first expected rewards vector and the second expected rewards vector being greater than a similarity threshold, employing, by the machine learning process, the constrained decision policy for generating the decision based on the context vector, and in response to the difference between the first expected rewards vector and the second expected rewards vector not being greater than the similarity threshold, employing, by the machine learning process, the reward-based decision policy for generating the decision based on the context vector, generate an explanation of the decision, the explanation comprising one or more factors contributing to the decision, electronically displaying the recommended decision and the explanation on the decision via a graphical user interface, wherein the explanation comprises an electronic visual list of a ranking of a number of most influential features employed to make the decision based on the constrained decision policy or the reward-based decision policy, and retraining the machine learning process by updating the reward-based policy based on a reward signal indicative of the electronic feedback that is received in response to respective decisions recommended by the machine learning process using the constrained decision policy and the reward-based decision policy.

9. The computer program product of claim 8, wherein the observing of the one or more teaching agents that are not the machine learning process occurs over a network and obtains a set of example decisions.

10. The computer program product of claim 8, wherein the choosing between the constrained decision policy and the reward-based decision policy further employs a constrained contextual multi-armed bandit setting.

11. The computer program product of claim 8, wherein the training of the machine learning process to learn the constrained decision policy comprises training implicitly using classical Thompson sampling.

12. The computer program product of claim 8, wherein the reward signal is received from an entity and indicates a quality of the decision.

13. The computer program product of claim 8, wherein the constrained decision policy is a first constrained decision policy, and wherein the machine learning process further learns a second constrained decision policy, and learns to choose between the first constrained decision policy, the second constrained decision policy, and the rewards-based decision policy.

14. The computer program product of claim 8, wherein the constrained decision policy is selected from a group consisting of: an ethical decision policy; a legal decision policy; a value decision policy; and a preference decision policy.

15. A computer system comprising:

a memory that stores computer executable components; and a processor that executes at least one of the computer executable components to perform operations comprising:

training a machine learning process to make decisions in response to receiving a decision context vector that represents a respective decision context, wherein the training comprises the machine learning process learning to make the decisions based on a constrained decision policy learned by the machine learning process observing one or more teaching agents that are not the machine learning process; and further training the machine learning process to:

learn a reward-based decision policy by using reinforcement learning techniques and electronic feedback that is received in response to respective decisions recommended by the machine learning process implementing the reward-based decision policy, and choose between the constrained decision policy and the reward-based decision policy to employ by the machine learning process in recommending a decision, wherein the choosing comprises:

receiving a context vector representing a new decision context, generating, using constrained Thompson sampling, a first expected rewards vector representing an output of the constrained decision policy based on the context vector as an input, generating, using the constrained Thompson sampling, a second expected rewards vector representing an output of the reward-based decision policy based on the context vector as an input, performing the choosing between the constrained decision policy and the reward-based decision policy based on a difference between the first expected rewards vector and the second expected rewards vector, wherein performing the choosing comprises:

in response to the difference between the first expected rewards vector and the second expected rewards vector being greater than a similarity threshold, employing, by the machine learning process, the constrained decision policy for generating the decision based on the context vector, and in response to the difference between the first expected rewards vector and the second expected rewards vector not being greater than the similarity threshold, selecting employing, by the machine learning process, the reward-based decision policy for generating the decision based on the context vector, generate an explanation of the decision, the explanation comprising one or more factors contributing to the decision, electronically displaying the recommended decision and the explanation on the decision via a graphical user interface operably coupled to the system, wherein the explanation comprises an electronic visual list of a ranking of a number of most influential features employed to make the decision based on the constrained decision policy or the reward-based decision policy, and retraining the machine learning process by updating the reward-based policy based on a reward signal indicative of the electronic feedback that is received in response to respective decisions recommended by the machine learning process using the constrained decision policy and the reward-based decision policy.

16. The computer system of claim 15, wherein the observing of the one or more teaching agents that are not the machine learning process occurs over a network and obtains a set of example decisions.

17. The computer system of claim 15, wherein the choosing between the constrained decision policy and the reward-based decision policy further employs a constrained contextual multi-armed bandit setting.

18. The computer system of claim 15, wherein the training of the machine learning process to learn the constrained decision policy comprises training implicitly using classical Thompson sampling.

19. The computer system of claim 15, wherein the reward signal is received from an entity and indicates a quality of the decision.

20. The computer system of claim 15, wherein the constrained decision policy is a first constrained decision policy, and wherein the machine learning process further learns a second constrained decision policy, and learns to choose between the first constrained decision policy, the second constrained decision policy, and the rewards-based decision policy.

* * * * *